(12) United States Patent
Liu et al.

(10) Patent No.: US 7,351,303 B2
(45) Date of Patent: Apr. 1, 2008

(54) MICROFLUIDIC SYSTEMS AND COMPONENTS

(75) Inventors: Chang Liu, Champaign, IL (US); Kashan Shaikh, Urbana, IL (US); Kee Ryu, Urbana, IL (US); Edgar Goluch, Urbana, IL (US); Zhifang Fan, Urbana, IL (US); David Bullen, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 6 days.

(21) Appl. No.: 10/683,473

(22) Filed: Oct. 9, 2003

(65) Prior Publication Data

US 2008/0017306 A1    Jan. 24, 2008

Related U.S. Application Data

(60) Provisional application No. 60/417,354, filed on Oct. 9, 2002, provisional application No. 60/474,974, filed on Jun. 2, 2003.

(51) Int. Cl.
*B29C 65/54* (2006.01)
*B32B 37/10* (2006.01)
*B32B 37/16* (2006.01)
*B32B 7/04* (2006.01)
*G01N 1/20* (2006.01)
*B29C 65/56* (2006.01)
*B01F 5/06* (2006.01)
*G01N 1/16* (2006.01)

(52) U.S. Cl. ............... 156/297; 156/290; 156/292; 156/308.2; 156/309.6; 422/100; 422/103; 438/737; 436/180; 366/340

(58) Field of Classification Search ........... 156/244.19, 156/290, 292, 297, 308.2, 309.6; 216/2, 216/33, 41, 52; 438/738; 435/287.2; 436/180; 417/413.1; 366/340, 341; 204/600, 601; 422/50, 99, 100, 103
See application file for complete search history.

(56) References Cited

U.S. PATENT DOCUMENTS

| 4,895,500 A | * | 1/1990 | Hok et al. ............... 417/566 |
| 5,250,263 A | * | 10/1993 | Manz ......................... 422/81 |
| 5,585,069 A | | 12/1996 | Zanzucchi et al. |
| 5,788,468 A | * | 8/1998 | Dewa et al. ............. 417/415 |

(Continued)

FOREIGN PATENT DOCUMENTS

WO    WO 01/04044 A1    1/2001

(Continued)

OTHER PUBLICATIONS

U.S. Appl. No. 60/296,852, filed Jun. 2001, O'Connor et al.*

(Continued)

*Primary Examiner*—Philip Tucker
*Assistant Examiner*—Sonya Mazumdar
(74) *Attorney, Agent, or Firm*—Greer, Burns & Crain, Ltd

(57) ABSTRACT

Microfluidic systems and components. A microfluidic system includes one or more functional units or microfluidic chips, configured to perform constituent steps in a process and interconnected to form the system. A multi-layer microfluidic system includes a separate dedicated fluid layer and dedicated electromechanical layer connected via through-holes. Electromechanical components are formed on the electromechanical layer.

24 Claims, 32 Drawing Sheets

U.S. PATENT DOCUMENTS

| | | | |
|---|---|---|---|
| 5,846,396 | A | 12/1998 | Zanzucchi et al. |
| 5,863,708 | A | 1/1999 | Zanzucchi et al. |
| 5,876,675 | A | 3/1999 | Kennedy |
| 5,882,465 | A * | 3/1999 | McReynolds ............... 156/285 |
| 5,980,704 | A | 11/1999 | Cherukuri et al. |
| 6,048,498 | A | 4/2000 | Kennedy |
| 6,091,179 | A * | 7/2000 | Tobe et al. .................. 310/328 |
| 6,136,212 | A * | 10/2000 | Mastrangelo et al. ......... 216/49 |
| 6,251,343 | B1 | 6/2001 | Dubrow et al. |
| 6,331,439 | B1 | 12/2001 | Cherukuri et al. |
| 6,457,654 | B1 * | 10/2002 | Glezer et al. .................. 239/4 |
| 6,551,838 | B2 * | 4/2003 | Santini et al. .............. 436/174 |
| 6,729,352 | B2 * | 5/2004 | O'Connor et al. .......... 137/827 |
| 2003/0000835 | A1 | 1/2003 | Witt et al. |
| 2003/0012697 | A1 | 1/2003 | Hahn et al. |
| 2005/0238967 | A1 * | 10/2005 | Rogers et al. ................. 430/5 |

FOREIGN PATENT DOCUMENTS

| | | | |
|---|---|---|---|
| WO | WO 01/70400 A1 | 9/2001 | |

OTHER PUBLICATIONS

B. H. Jo, L. M. VanLerberghe, K. M. Motsegood and D. J. Beebe, "Three-Dimensional Micro-Channel Fabrication in Polydimethisilozane (PDMS) Elastomer," Journal of Microelectromechanical Systems, vol. 9, No. 1, pp. 76-81, 2000.

B. L. Gray, D. J., N. J. Mourlas, B. P. van Drieënhuizen, K. R. Williams, N. I. Maluf adb G. T. A. Kovacs (1999), "Novel Interconnection Technologies for Integrated Microfluidic Systems," Sensors and Actuators A: Physical 77(1): 57-65.

C.M. Ho, "Fluidics—The Link Between Micro and Nano Sciences and Technologies," Proc. 14th IEEE Int. Conf. MEMS, Interlaken, Switzerland, p. 375, 2001.

D. Armani, C. Liu, "Microfabrication Technology for Plycaprolactom, a Biodegradable Polymer," Journal of Micromechanics and Microengineering, vol. 10, pp. 80-84, 2000.

D. Armani, C. Liu, "Re-configurable Fluid Circuits By PDMS Elastomer Micromachining," 12th International Conference on MEMS 99, pp. 222-227, Orlando, FL, 1998.

D. Bullen, X. Wang, J. Zou, S. Hong, S. Chung, K.S. Ryu, Z. Fan, C.A. Mirkin, C. Liu, "Micromachined Arrayed Dip Pen Nanolithography (DPN) Probes for Sub-100 nm Direct Chemistry Patterning," Proceedings of 16th IEEE Int. Micro Electro Mechanical Systems Conf., MEMS 2003, Kyoto, Japan, Jan. 19-23, 2003.

F. Laermer, A. Schilp, German patent DE 4241045. F. Lamer, A. Schilp, K. Funk, M. Offenberg, "BOSCH Deep Silicon Etching Improving Uniformity and Tech Rate for Advanced MEMS Applications," Proc. MEMS'99, pp. 211-216, Florida, 1999.

Foster, L. S. and I. J. Gruntfest, "Demonstration Experiments Using Universal Indicators," J. Chem. Ed., 14, 274 (1937).

G. B. Lee, S H. Chen, G. R. Huang, W. C. Sung, Y. Lin, "Microfabricated Plastic Chips by Hot Embossing Methods and their Applications for DNA Separation and Detection," Sensors and Actuators B: Chemical, vol. 75 pp. 142-148, 2001.

G. K. A. Kovacs, "Micromachined Transducers Sourcebook," Chapter 6, McGraw-Hill, 1998.

Hsieh, M.C., et al., "Á Contact-Type Piezoresistive Micro-Shear Stress Sensor for Above-Knee Prosthesis Application," Microelectromechanical Systems, 2001. 10(1): p. 121-127.

J. Chen, S. Park, Z. Fan, G. Eden, C. Liu, "Development and Characterization of Micromachined Hollow Cathode Plasma Display Devices," IEEE Journal of Microelectromechanical Systems, vol. 11, No. 5, pp. 536-543, Oct. 2002.

J. Chen, Z. Fan, J. Zou, J. Engel, and C. Liu, "Two Dimensional Micromachined Flow Sensor array for Fluid Mechanics Studies," ASCE Journal of Aerospace Engineering, accepted, Apr. 2003.

J. Cheng, L. Wu, P. Swanson, J. P. O'Connell, "Biochip-Based Portable Laboratory," In Biochip Technology (eds.) Cheng, J. and Kricka, L. J., Harwood Academic Publishers, PA, U.S.Z., 269-289, 2001. http://www.nanogen.com/.

J. Li, Z. Fan, J. Chen, J. Zou, C. Liu, "High Yield Microfabrication Process for Biomimetic Artificial Haircell Sensors," Smart Electronics, MEMS, and Nanotechnology Conference (4700), SPIE's 9th Annual International Symposium on Smart Structures and Materials, Mar. 17-21, 2002, San Diego, CA.

Jorgensen, A. M., et al., "A Biochemical Microdevice with an Integrated Chemiluminescence Detector," Sensors and Actuators B: Chemical, 2003, 90(1-3): p. 15-21.

K. E. Petersen, "Silicon as a Mechanical Material," Proc. of IEEE, vol. 70, No. 5, pp. 420-457, 1982.

K. Ryu and C. Liu, "Precision Patterning of PDMS Thin Films: A New Fabrication Method and Its Applications," Sixth International Symposium on Micro Total Analysis System (mTAS), Nara, Japan Nov. 3-7, 2002.

K. Ryu, K. Shaikh, and C. Liu, "A Method to Monolithically Integrate Elastomer O-rings on Parylene Membranes for Improved Valve Sealing," presented at the Seventh International Conference on Minlaturized Chemical and Biochemical Analysis Systems (microTAS 2003), Squaw Valley, California U.S.A., 2003.

K. Ryu, K. Shaikh, and C. Liu, "Micro Magnetic Stir-Bars Integrated in Parylene Surface-Micromachined Channels For Mixing and Pumping," The Seventh International Conference on Minaturized Chemical and Biochemical Analysis Systems (microTAS) 2003), 2003, Squaw Valley, California, U.S.A.

K. Ryu, Z. Fan, and C. Liu, "Microfabrication Process for High-Density Micro Pipette Array and Matching Multi-Well Plate with Mixers," presented at sixth International Symposium on Micro Total analysis System, Nara, Japan. Nov. 2002.

K. Shaikh, K. S. Ryu, Z. Fan, and C. Liu, "Fabrication of Through-Wafer Fluid Interconnects with Low Dead Volume and Integrated Back-Plane Fluid Jumpers," presented at the Seventh International Conference on Miniaturized Chemical and Biochemical Analysis Systems (microTAS 2003), Squaw Valley, California U.S.A., 2003.

L-H Lu, K. Ryu, and C. Liu, "A Magnetic Microstirrer and Array for Microfluidic Mixing," IEEE Journal of Microelectromechanical Systems, vol. 11, No. 5, pp. 462-469, Oct. 2002.

M. A. Burns, B. N. Johnson, S. N. Brahmasandra, K. Handique, J. R. Webster, M. Krishnan, T.S. Sammarco, P. M. Man, D. Jones, D. Heldsinger, C. H. Mastrangelo, and D. T. Burke, "An Integrated Nanoliter DNA Analysis Device," Science 1998 Oct. 16; 282: 484-487.

M. Jones, D. Alland, M. Marras, H. El-Hajj, M. E. Taylor, and W. McMillan. "Rapid and Sensitive Detection of Mycobacterium DNA using Cepheid SmartCycler and Tube Lysis System," Clin. Chem. 47(10): 1917-1918, 2001. http://www.cepheid.com.

M. Khoo, C. Liu, "Micro Magnetic Silicone Elastomer Membrane Actuator," Sensors and Actuators, vol. 89, No. 3, pp. 259-266, Mar. 2001.

Marc A. Unger, Hou-Pu Chou, Todd Thorsen, Axel Scherer, and Stephen R. Quake, "Monolithic Microfabricated Valves and Pumps by Multilayer Soft Lithography," Science 2000 Apr. 7; 288: 113-116.

R. A. Mathies, E. T. Lagally, T. Kamei, W. G. Grover, C. N. Liu, J. R. Scherer, R. A. Street, "Capillary Array Electrophoresis Bioprocessors," Proc. IEEE Solid-state Sensors, Actuators, and Microsystems Workshop, pp. 112-118, Hilton Head Island, SC, 2002.

R. H. Liu, H. Chen, K. R. Luehrsn, D. Ganser, D. Weston, J. Blackwell, P.Grodzinski, "Highly Parallel Integrated Microflideic Biochannel Arrays," 14th Int. Conf. On MEMS, MEMS'01, pp. 493-442, 2001.

S. R. Quake and A. Scherer, "From Micro- to Nanofabrication with Soft Materials," Science, 290: 1536-1540, 2000.

Thornsen, T., S. J. Maerkl, and S. R,. Quake, "Microfluidic Large-Scale Integration," Science, 2002, 298: pp. 580-584.

William H. Grover, AMM.S., Chung N. Liu, Eric T. Lagally and Richard A. Mathies (2003), "Monolithic Membrane Valves and Diaphragm Pumps for Practical Large-Scale Integration into Glass Microfluidic Devices," Sensors and Actuators B: Chemical 89(3): 315-323.

X. Li, T. Abe, Y. Liu, M. Esashi, "High Density Electrical Feedthrough Fabricated by Deep Reactive Ion Etching of Pyrex

*Glass*," Proc. 14th IEEE Int. Conf. On MEMS, MEMS 2001, pp. 98-101, Interlaken, Switzerland, 2001.

X. Wang, J. Engel, J. Chen, and C. Liu, "*Liquid Crystal Polymer Based MEMS Applications*," 4th Advanced Technology Workshop on Packaging of MEMS and Related micro Integrated Nano Systems, International Microelectronics and Packaging Society Symposium (IMAPS 2002) Denver, CO, Sep. 4-6, 2002.

Z. Fan, J. Chen, J. Zou, D. Bullen, C. Liu, F. Delcomyn, "*Design and Fabrication of Artificial Lateral-Line Flow Sensors*," Journal of Micromechanics and Microengineering, vol. 12, No. 5, pp. 655-661, Sep. 2002.

J. Shih, and Y.C. Tai, "*Integrated Surface-Micmachined Mass Flow Controller*," in Micro Electro Mechanical Systems, IEEE the Sixteenth Annual International Conference on, 2003, Kyoto.

\* cited by examiner

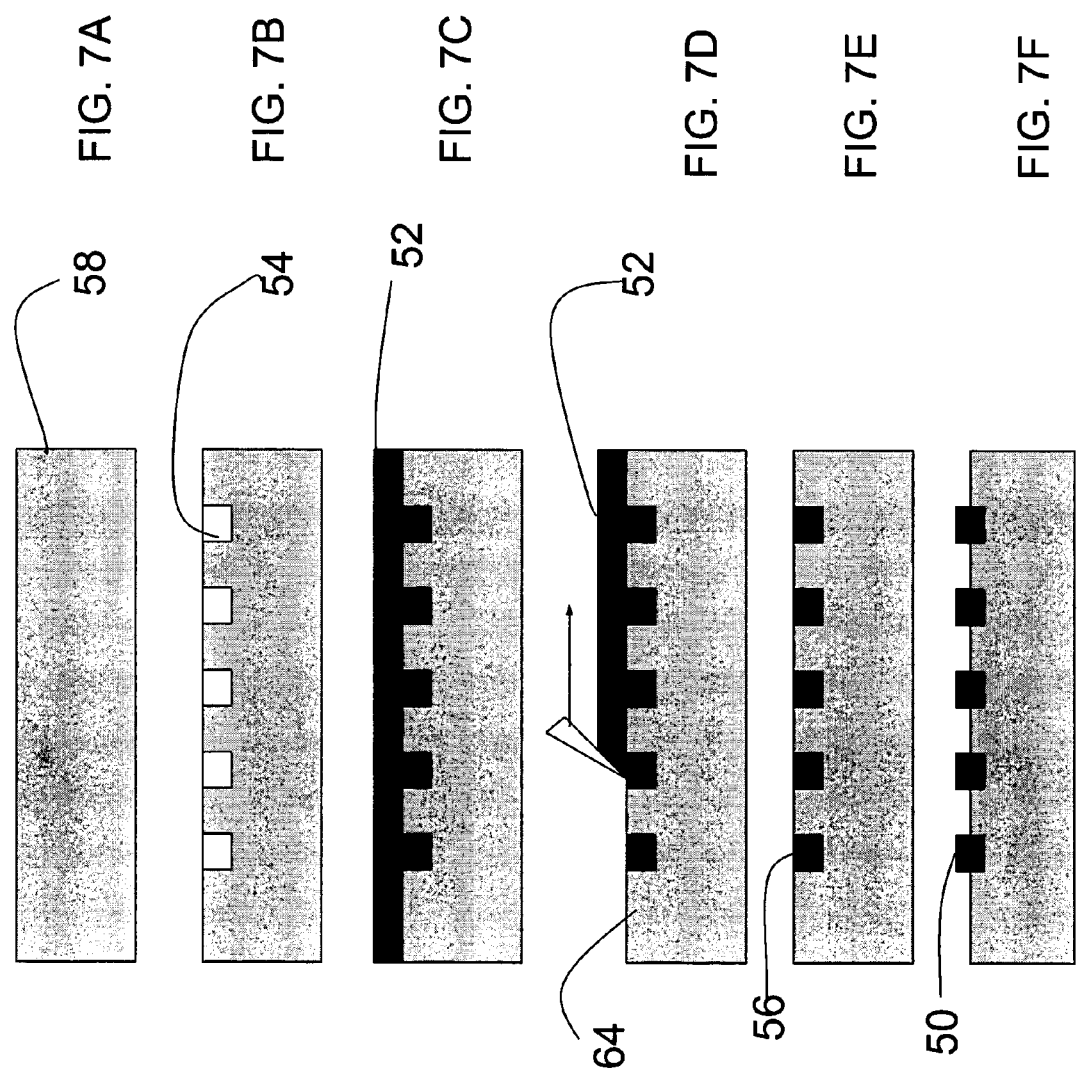

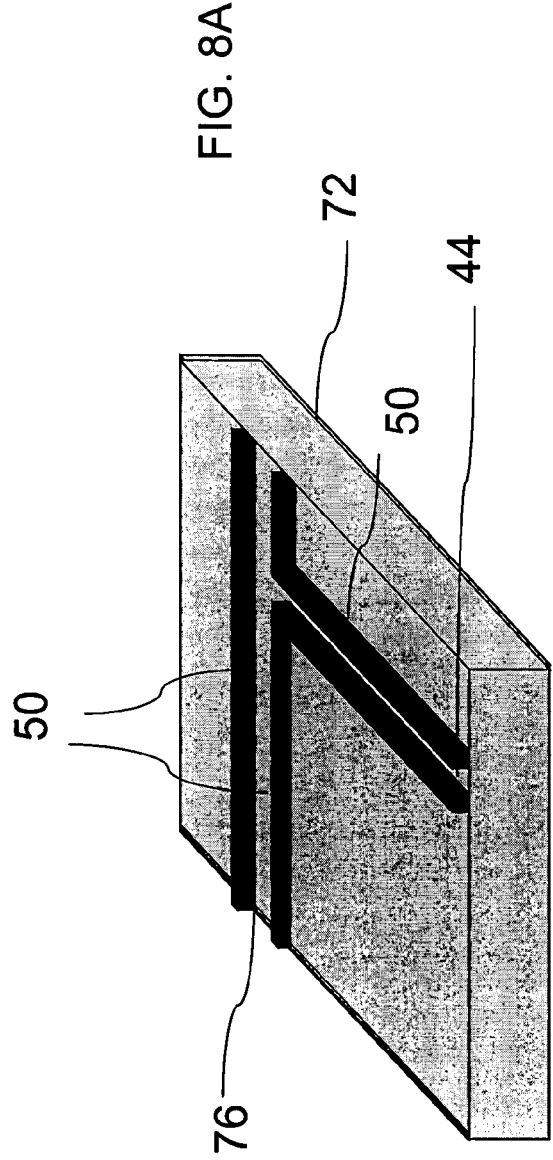
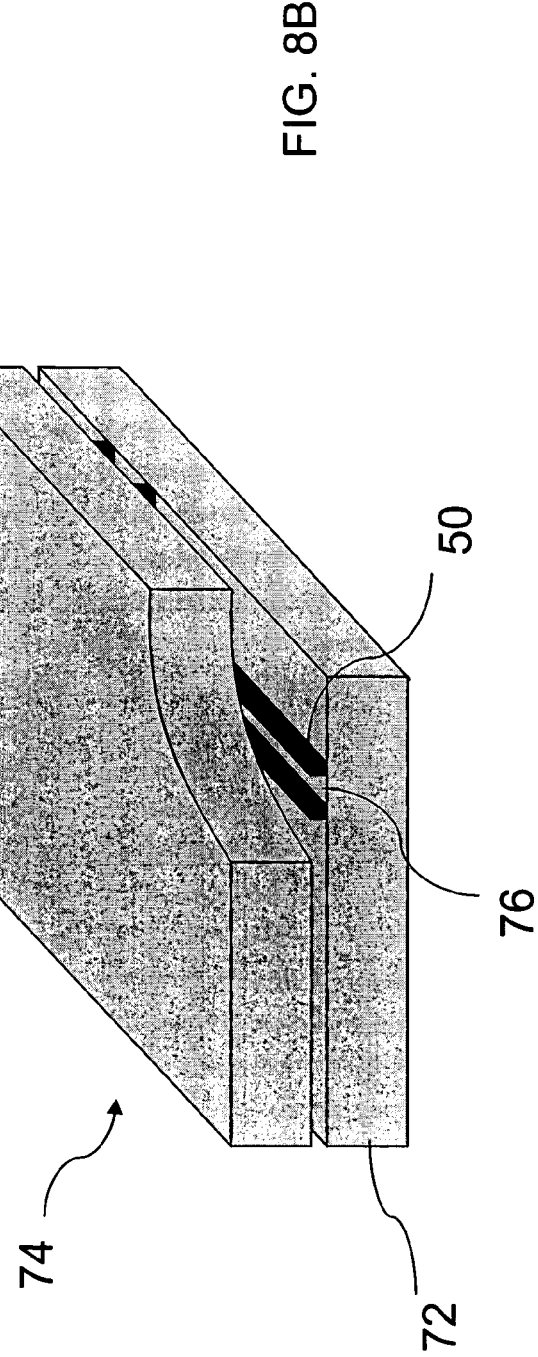

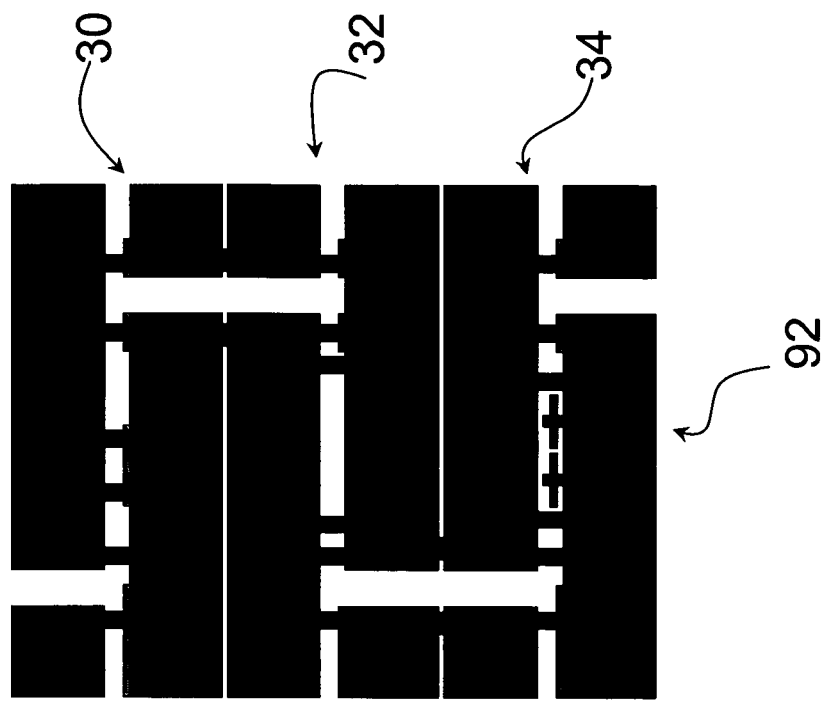
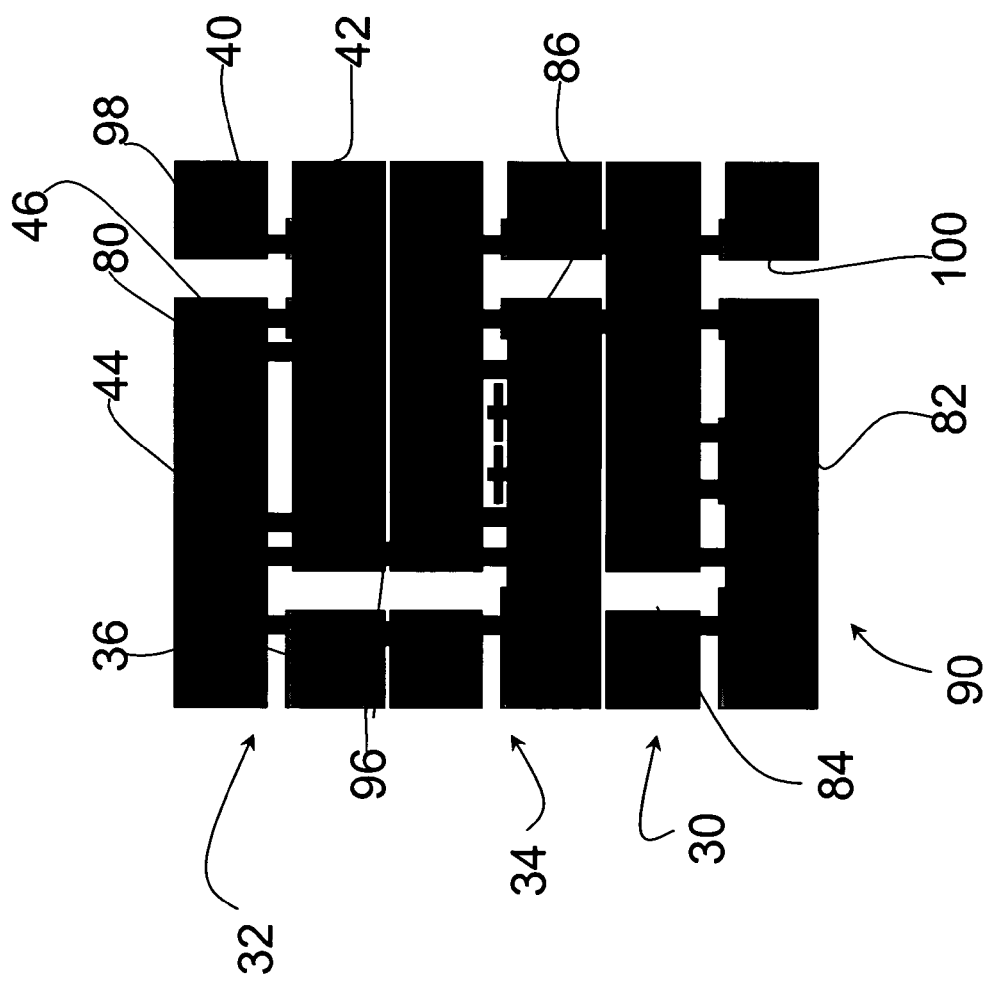

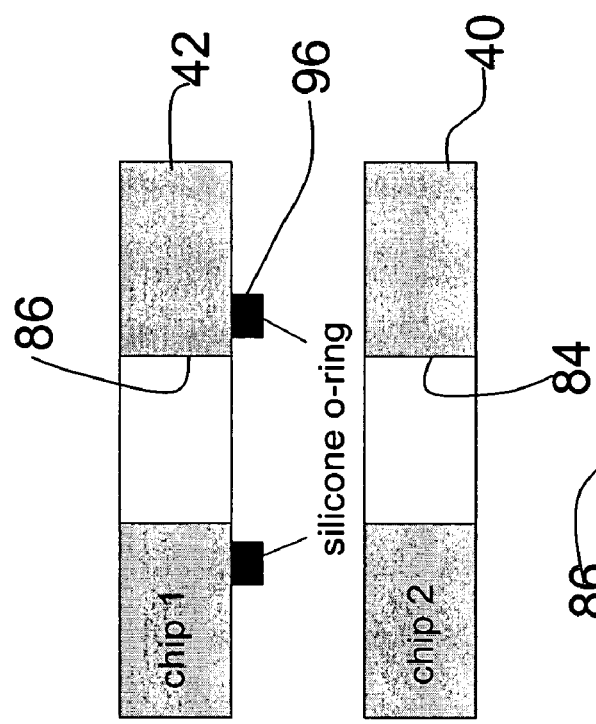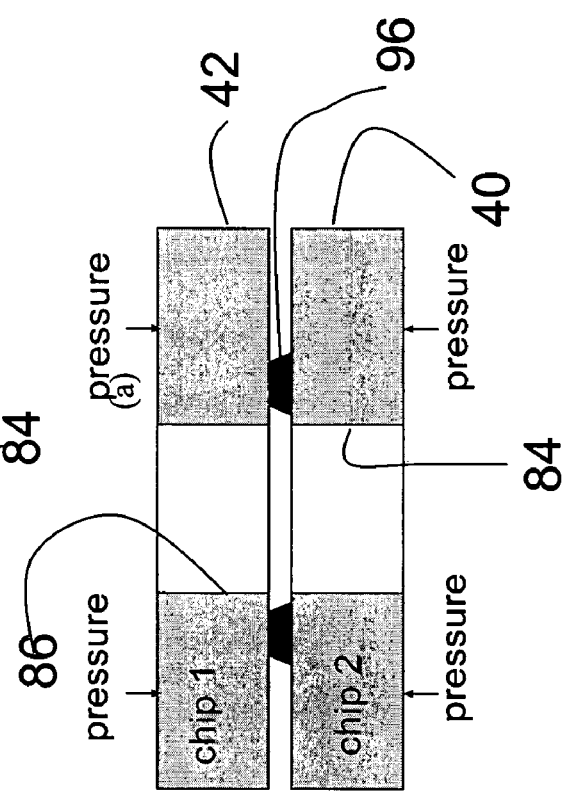

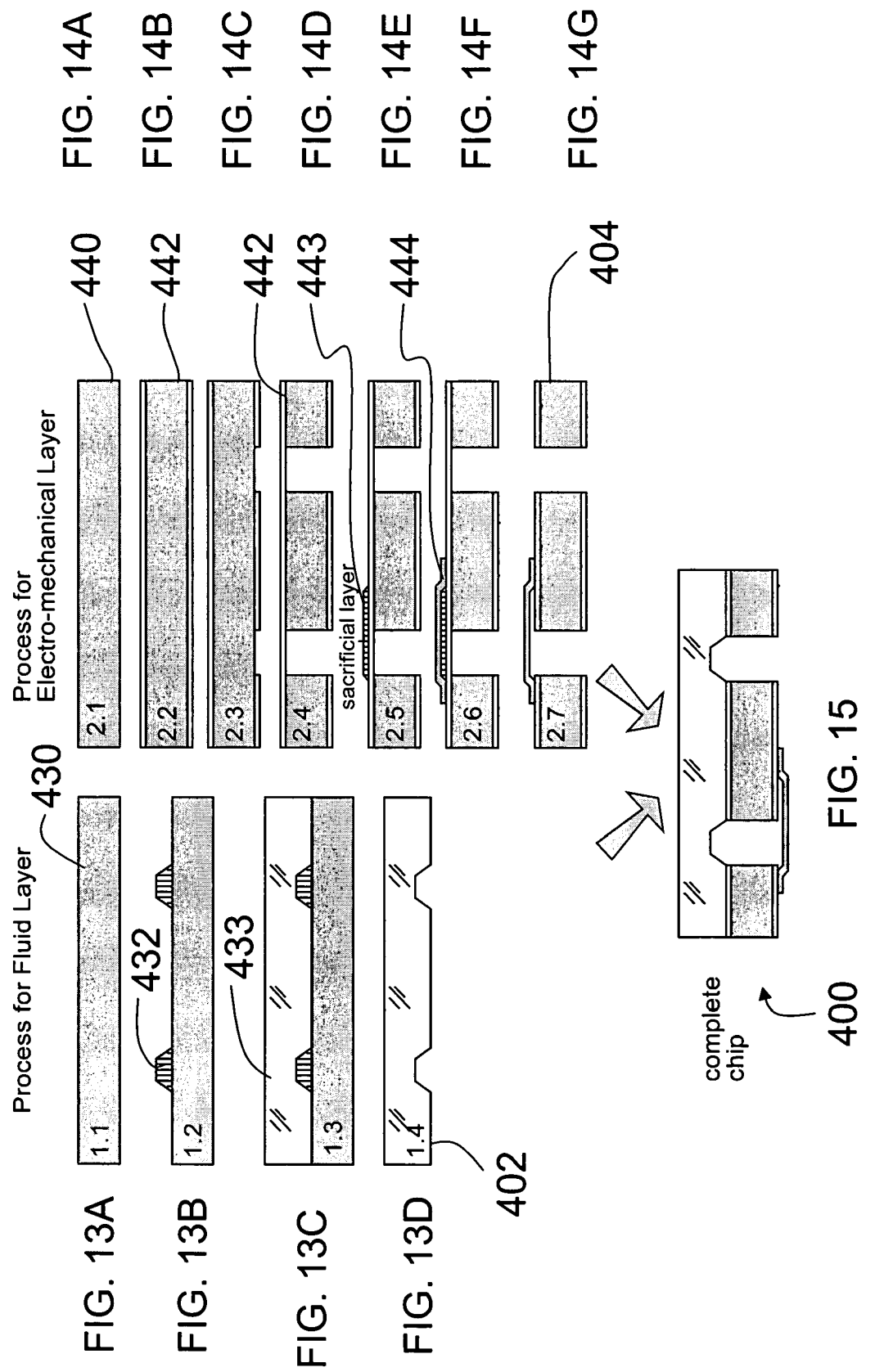

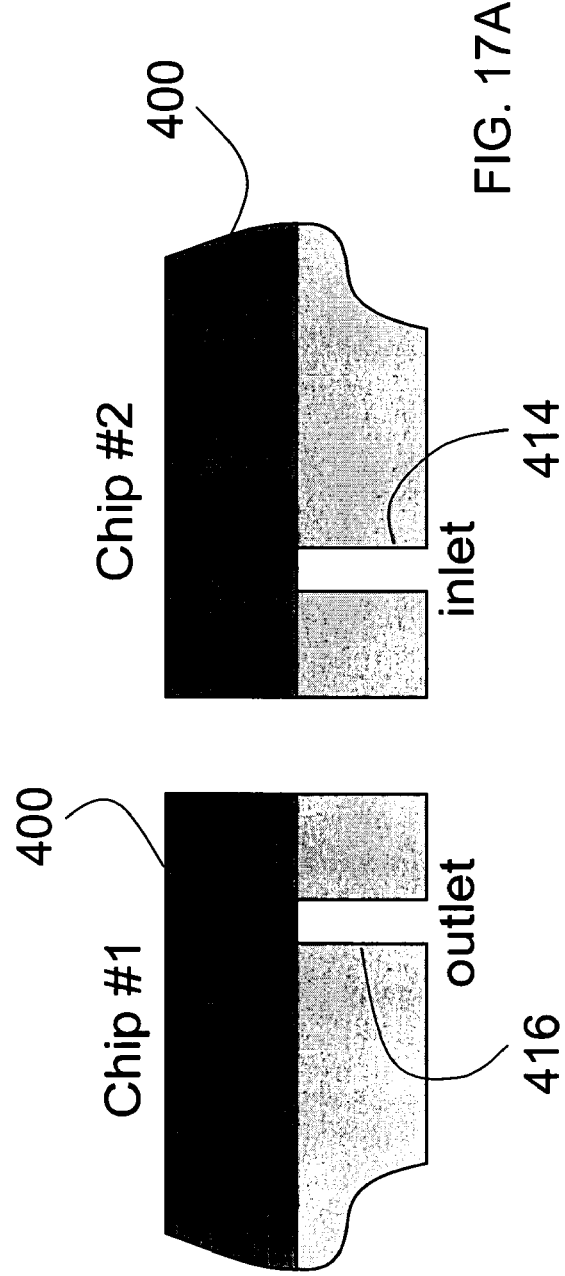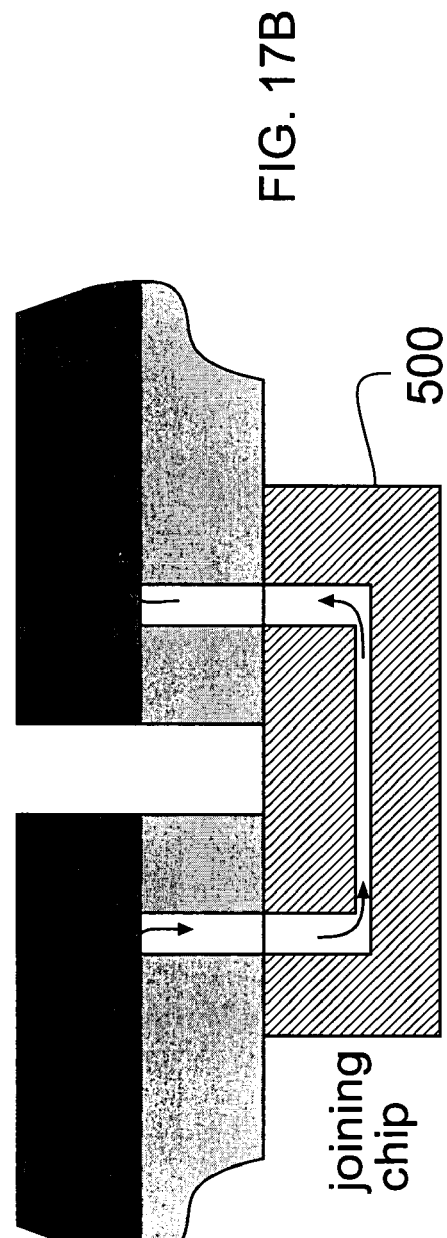
FIG. 17A
FIG. 17B

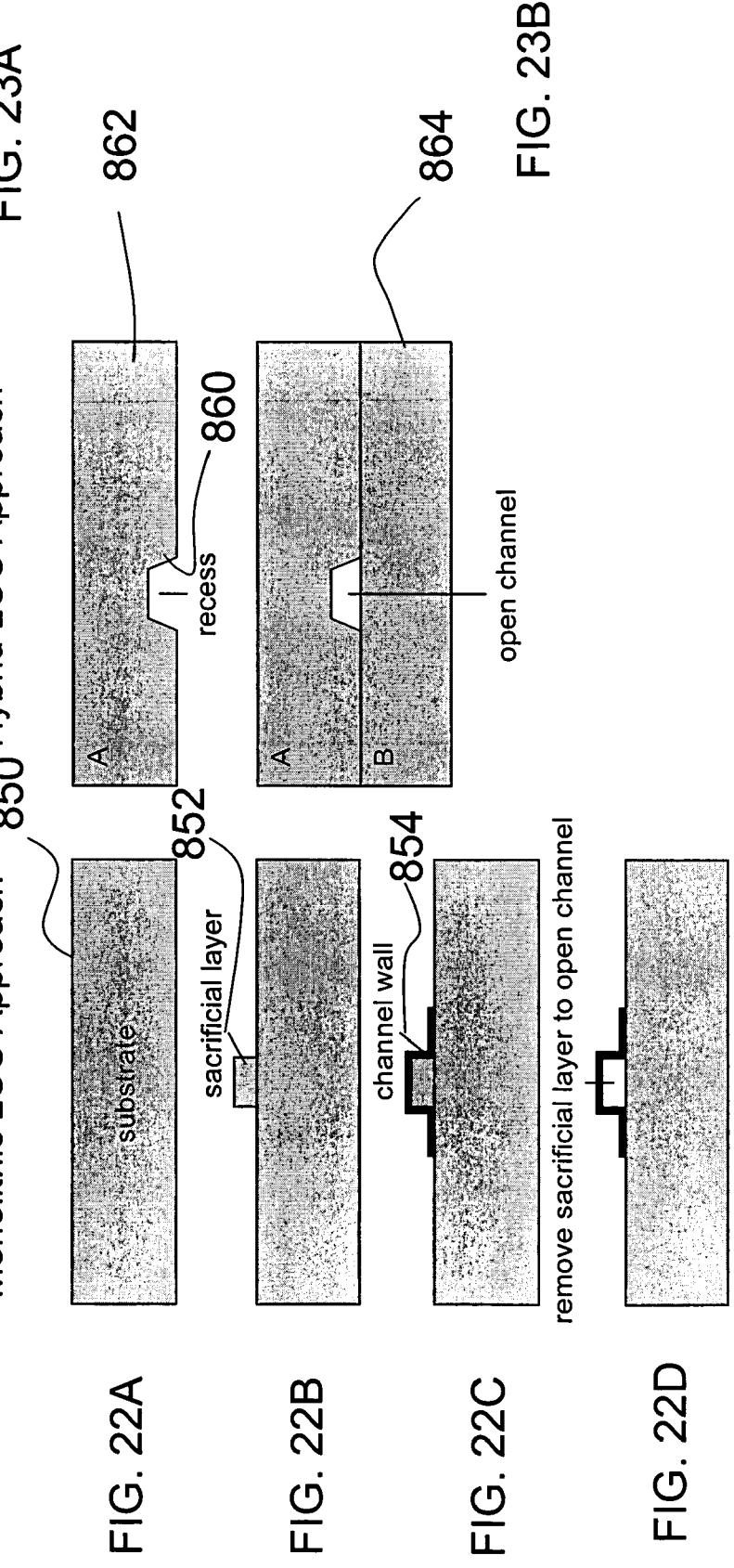

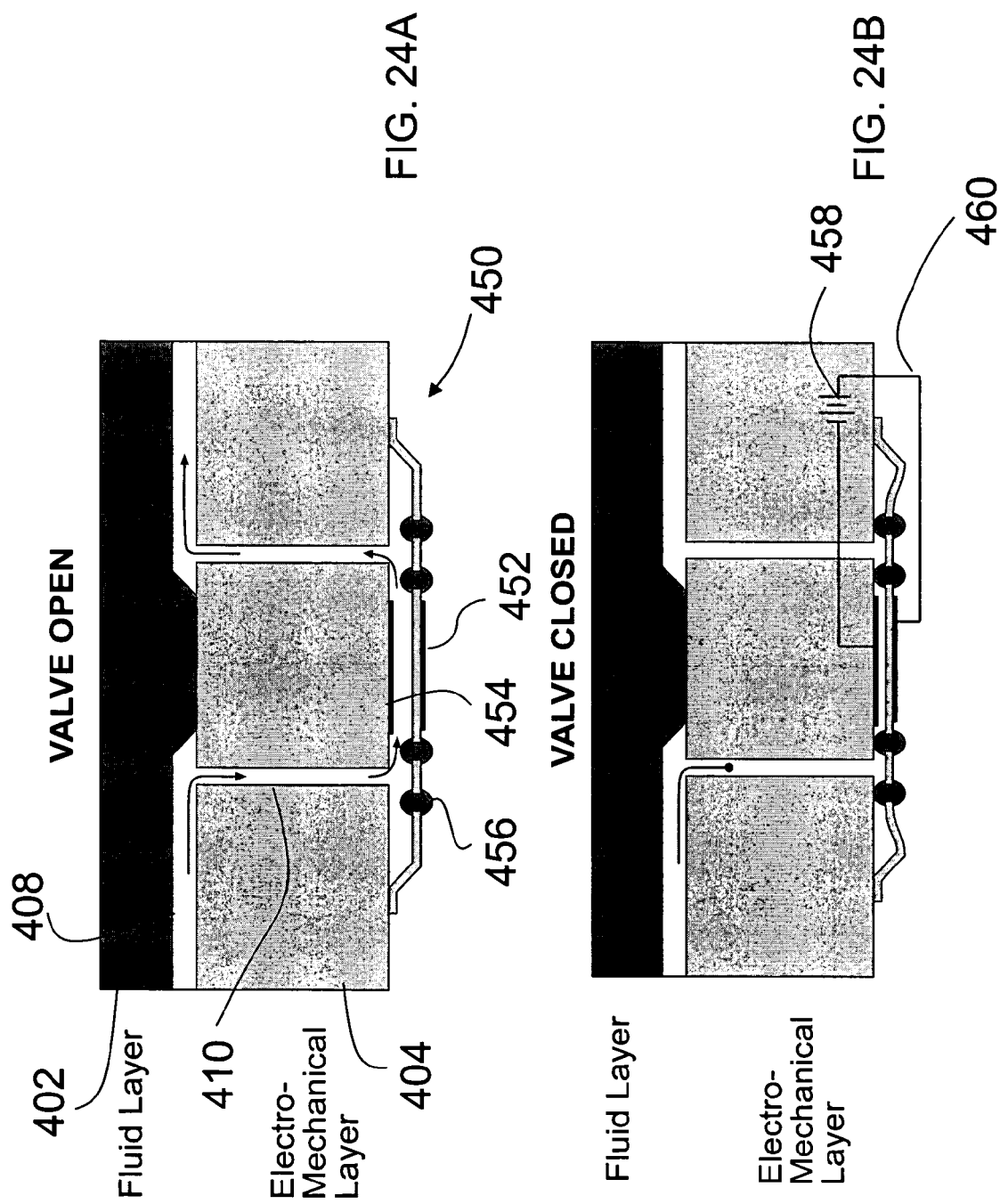

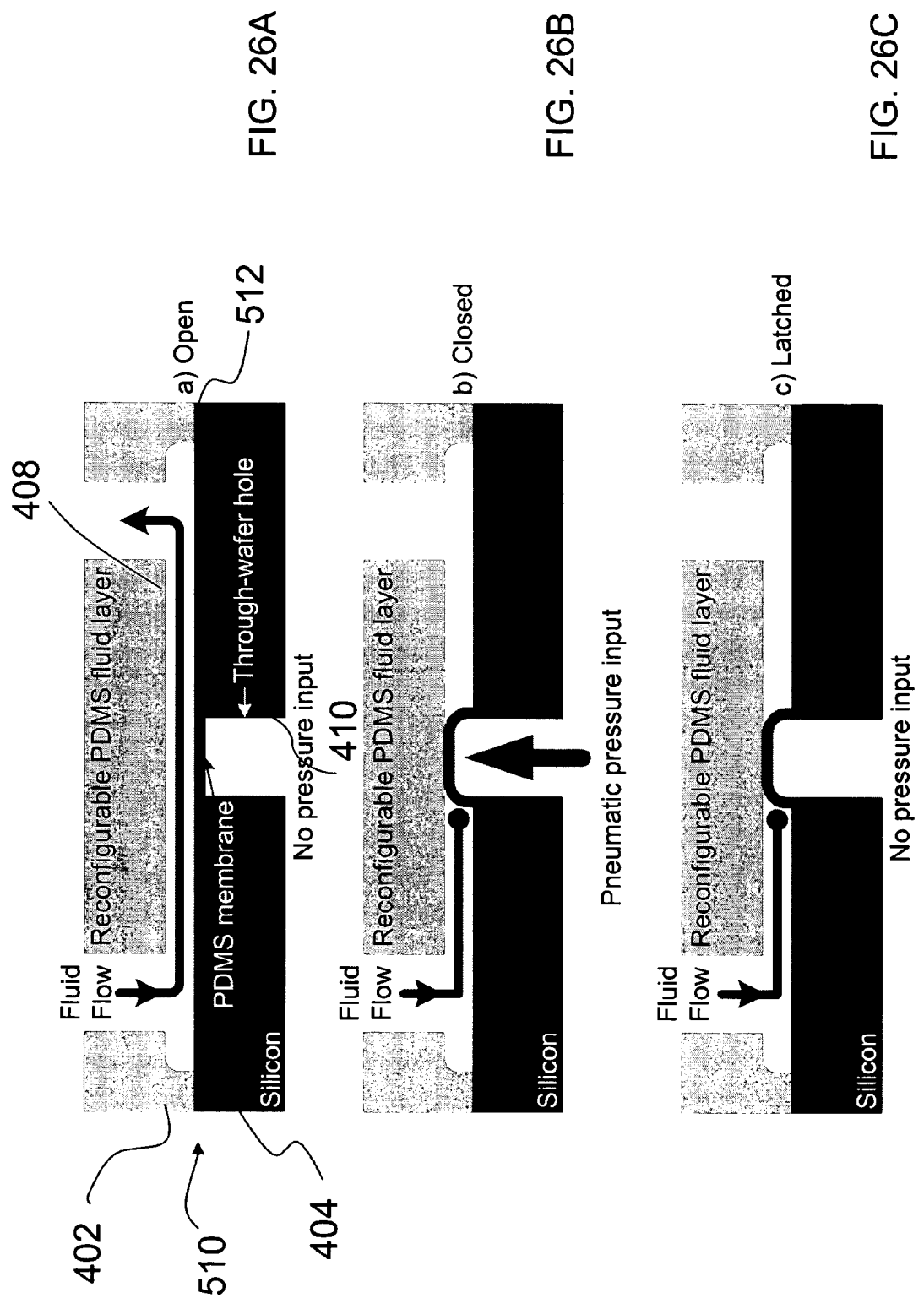

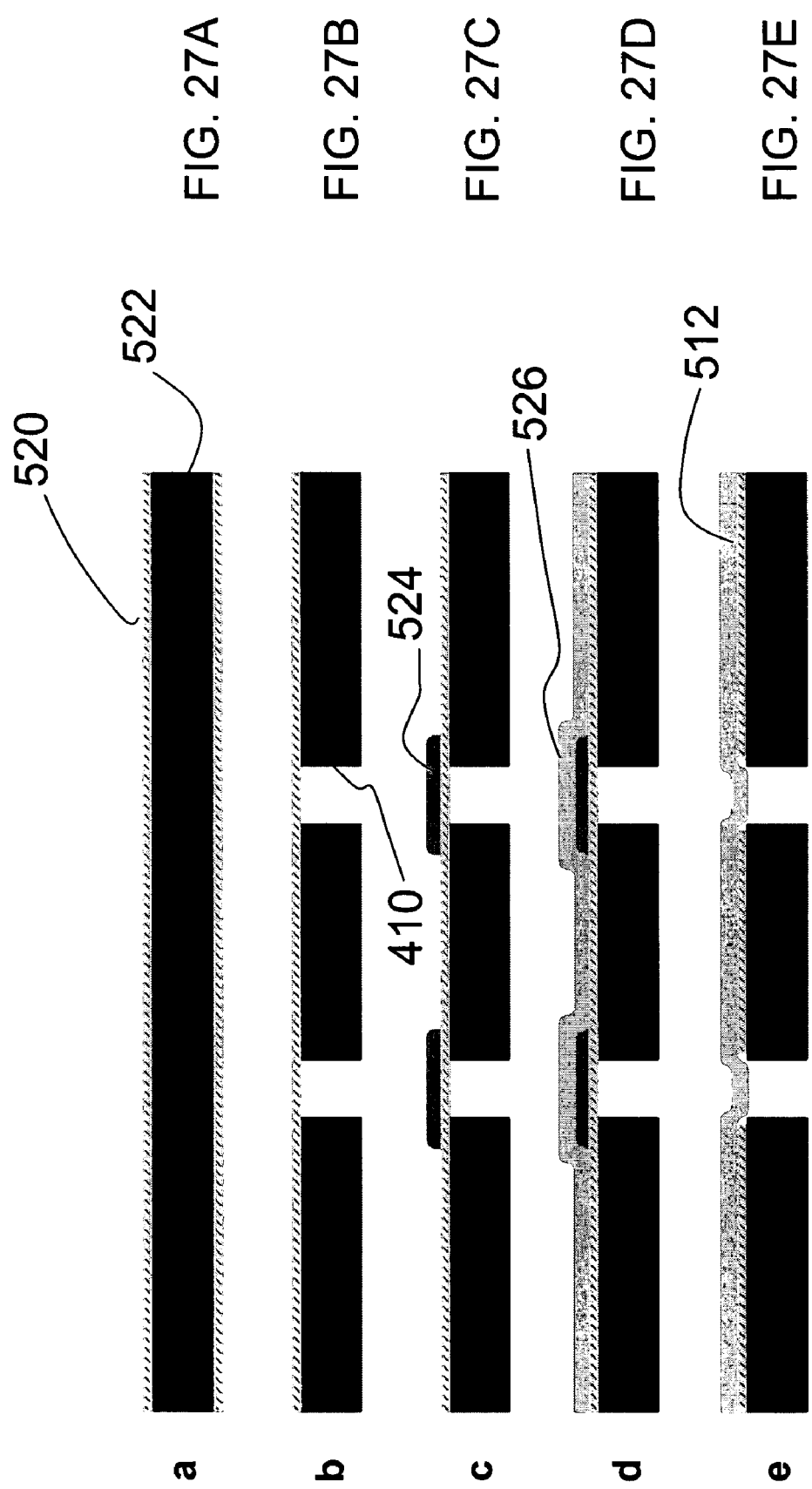

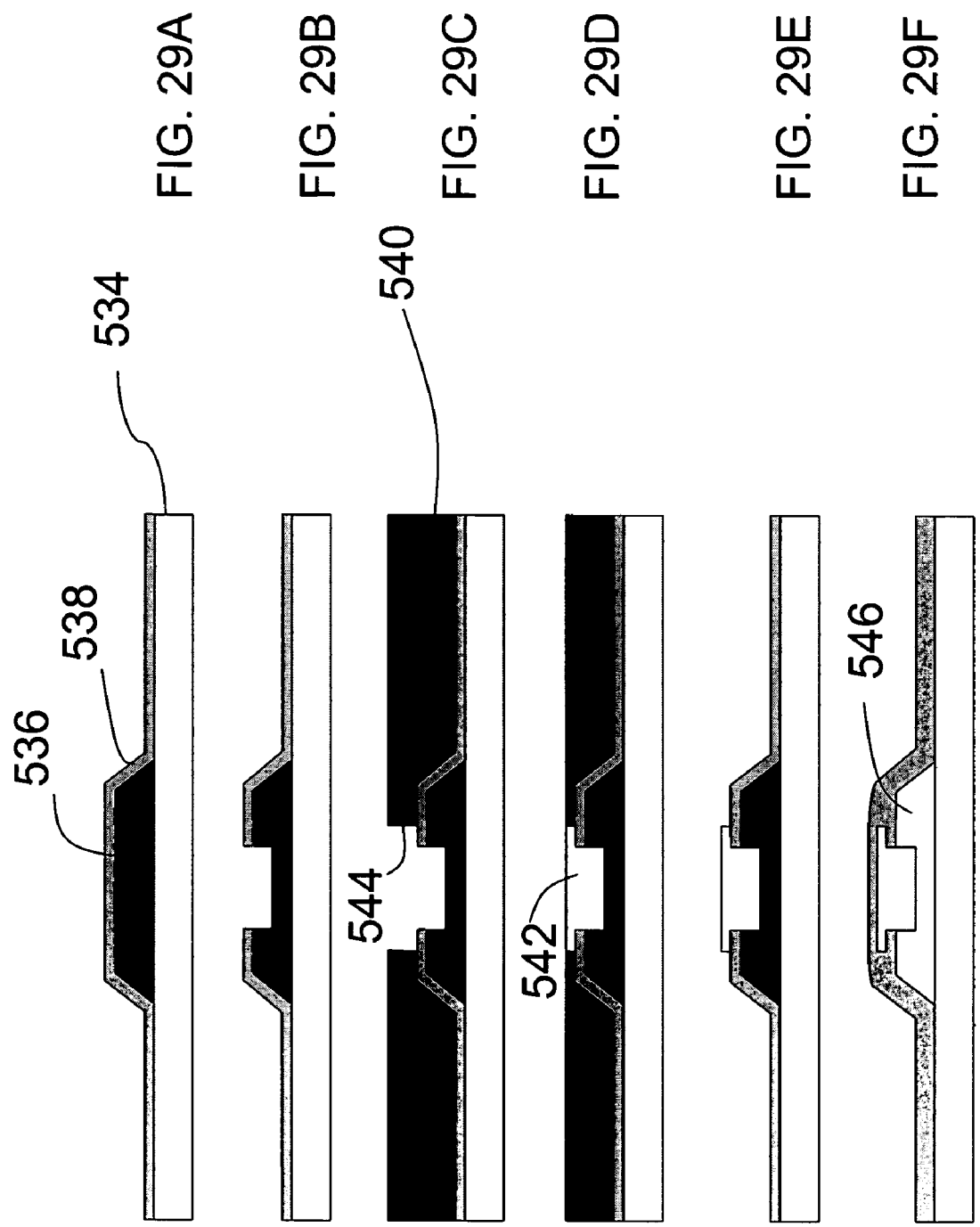

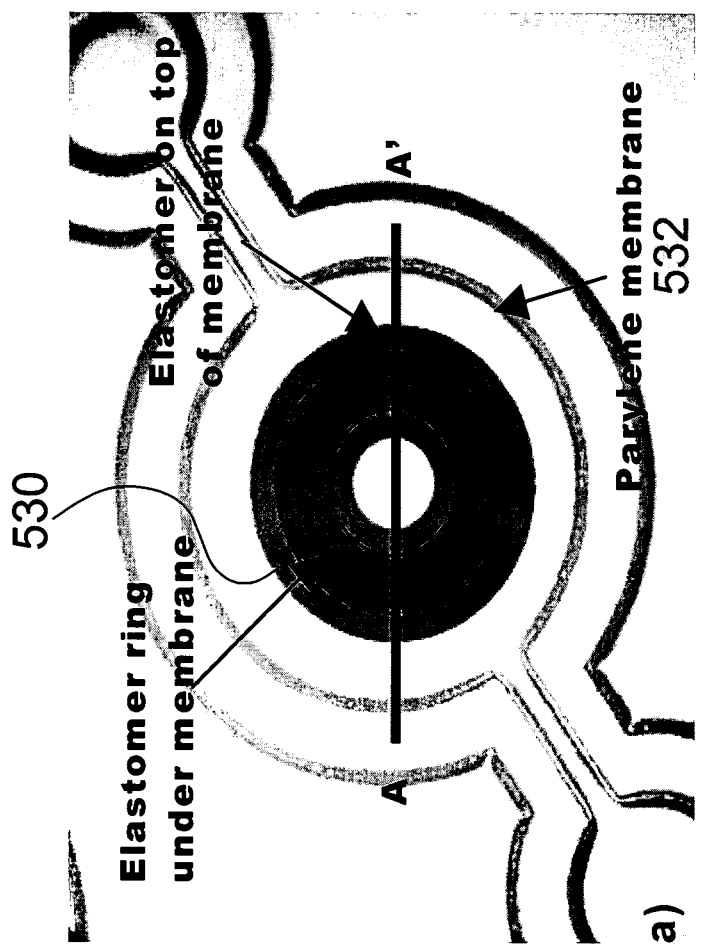
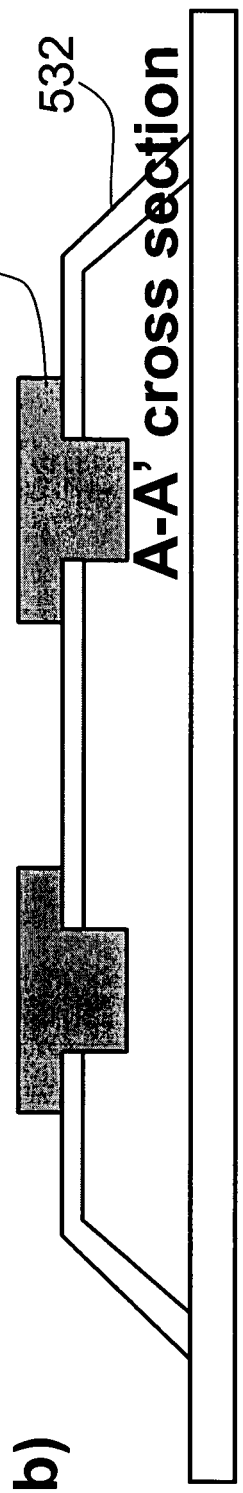
FIG. 31A
FIG. 31B a) perspective view b) Mixer c) Pump

_US 7,351,303 B2_

MICROFLUIDIC SYSTEMS AND COMPONENTS

PRIORITY CLAIM

This application claims priority of, and incorporates by reference, U.S. Provisional Application No. 60/417,354, filed Oct. 9, 2002, and U.S. Provisional Application No. 60/474,974, filed Jun. 2, 2003, under 35 U.S.C. § 119.

STATEMENT OF GOVERNMENT INTEREST

This invention was made with Government assistance under National Science Foundation (NSF) Contract Number 0830520, and under Air Force Office of Scientific Research (AFOSR) Contract Number F49620-01-1-0401. The Government has certain rights in this invention.

FIELD OF THE INVENTION

This invention relates generally to the fields of biochemical and chemical analysis, and more specifically to the field of microfluidics.

BACKGROUND OF THE INVENTION

Microfluidic systems provide low cost, highly integrated platforms for carrying out biochemical and chemical tasks such as chemical transport and biochemical analysis in compact, automated, and sometimes portable fashion. Microfluidic systems may contain components to transport biochemical fluids, to store fluids, biological cells, or particles, and/or to facilitate reaction between fluids and chemical substances. As a non-limiting example, microfluidic systems may be used for blood sampling, DNA hybridization tests, protein-enzyme reaction, drug discovery, and combinatorial chemistry. Microfluidic systems have the potential to realize point-of-care detection and dramatically increase the speed of biochemical screening and diagnosis.

A microfluidic system may contain a complete microlaboratory integrated on a chip, analogous to an integrated circuit, for fluid and chemical handling, storage, and reaction functionalities. Portability can be provided through miniaturization, low cost through integration, and simplicity of operation through automation. Integration of a laboratory on a chip enables parallel, and thus more efficient, discovery. Fast, high throughput medical diagnosis and drug discovery are enabled with such chips. Continuous environmental monitoring is possible for civilian, industrial, and military interest.

However, existing microfluidic systems have high development cost and development time, representing a significant barrier to commercialization of integrated microfluidic devices. A typical microfluidic chip may contain a variety of process components. For each unique chip that performs a particular task, many such microfluidic components must be integrated onto the chip, and a new set of mask layout and prototyping and fabrication processes must be performed. Fabrication of particular microfluidic chips can require expertise in, among other things, chip fabrication technology, material, biological and/or chemical reaction, and fluid mechanics. This significantly adds to the development time and cost of a chip.

Furthermore, a chip designed for a particular process cannot be easily modified, optimized, or otherwise configured for other processes. Existing microfluidic chips are thus inflexible in terms of their functionality. To perform even simple modifications to a microfluidic process, the chip must be redesigned, and a new set of mask layout and fabrication processes must be performed. These and other factors significantly increase the development time and cost of the chip, thus decreasing the availability and adoption of such chips in the art, and negating their many advantages.

SUMMARY OF THE INVENTION

A number of microfluidic systems and components are provided. One type of microfluidic system includes one or more functional units or microfluidic chips that are configured to perform constituent steps in a process and interconnected to form the system. Another type of system, a multi-layer microfluidic system, includes a separate fluid layer and electromechanical layer connected through through-holes. A number of electromechanical components are provided, which may be formed on the electromechanical layer.

BRIEF DESCRIPTION OF THE DRAWINGS

FIGS. 7A-7F show a process for forming ridges in recessed regions, according to an embodiment of the present invention;

FIGS. 8A-8B show ridges of a bottom layer, and an assembled functional unit, respectively;

FIGS. 9A-9B show arrangements of functional units, according to an embodiment of the present invention;

FIGS. 10A-10B show a process for forming an O-ring, according to a method of the present invention;

FIGS. 13A-13D show steps for manufacturing a fluid layer, according to an embodiment of the present invention;

FIGS. 14A-14G show steps for manufacturing an electromechanical layer, according to an embodiment of the present invention;

FIG. 15 shows an assembled microfluidic chip;

FIGS. 17A-17B show a cross-section of a pair of microfluidic chips connected by a fluid connector, according to an embodiment of the present invention;

FIGS. 22A-22D show a monolithic approach for forming a channel;

FIGS. 23A-23B show a hybrid approach for forming a channel;

FIGS. 24A-24B show operation of an electrostatic valve, according to another embodiment of the present invention;

FIGS. 26A-26C show operation of a pneumatic valve, according to another embodiment of the present invention;

FIGS. 27A-27E show a process for making a pneumatic valve, according to an embodiment of the present invention;

FIGS. 29A-29F show a process for forming an elastomer ring, according to an embodiment of the present invention;

FIGS. 31A-31B are a top view and cross-sectional view, respectively of an elastomer ring and membrane;

DETAILED DESCRIPTION OF THE INVENTION

Figure 1:
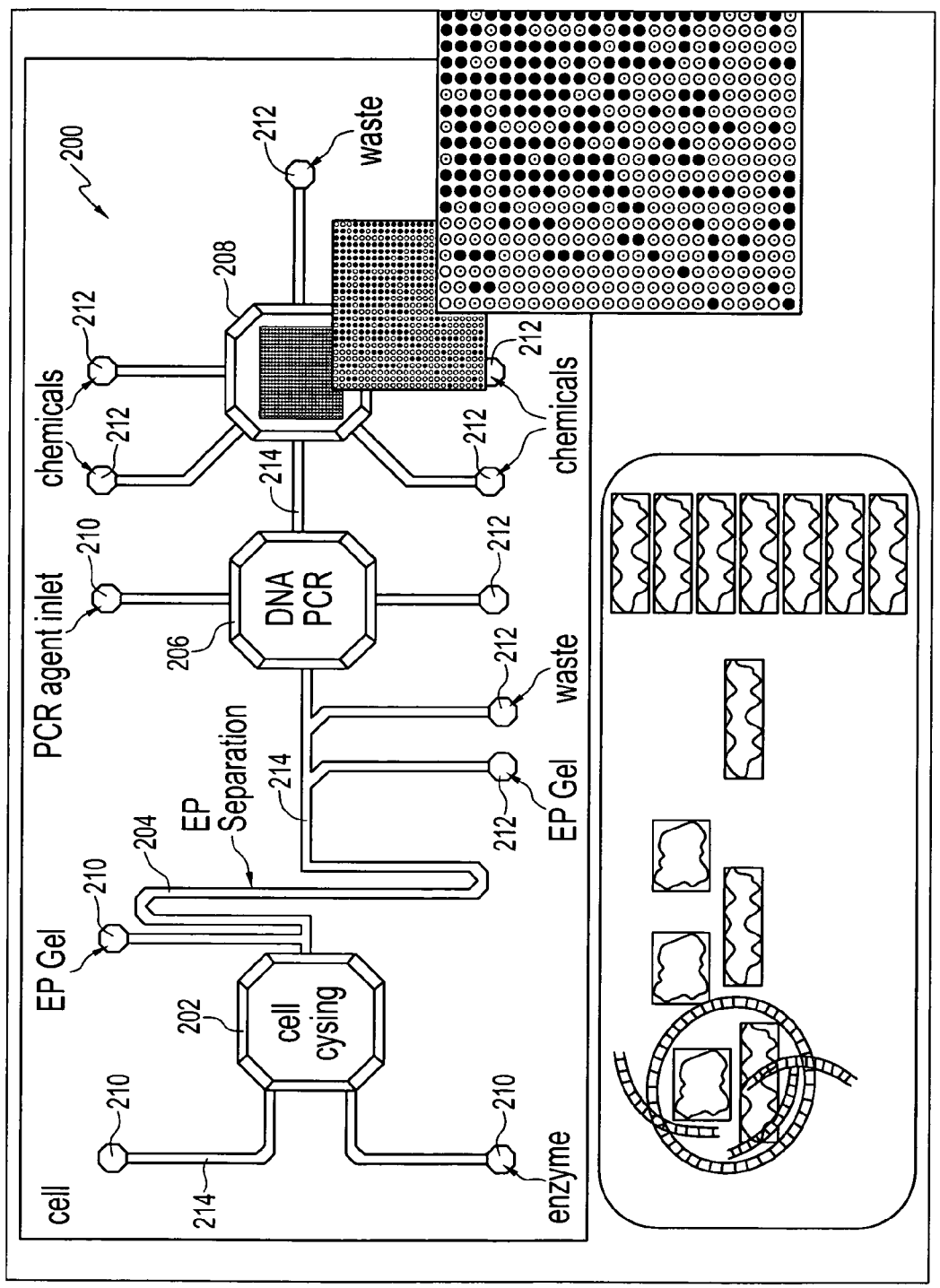
FIG. 1 shows a simplified layout of a typical rapid DNA sequencing chip.

It is desired to provide microfluidic systems and microfluidic components that can be produced at a lower cost relative to conventional systems, that can be customized by an end user, and that preferably are portable yet still provide various microfluidic functions. The present invention provides, among other things, microfluidic systems and components, and methods for designing and fabricating microfluidic systems and components.

An exemplary microfluidic system according to an embodiment of the present invention includes a plurality of modular functional units that are used to partition a complex system-level function into a sequence of constituent steps. The steps may be, for example, sequential steps of a more complex system. Preferably, each of the functional units performs one of the constituent steps. The functional units are assembled and interconnected to form a microfluidic system. The functional units are configured and arranged so that fluid communication is possible between them.

Another embodiment of the present invention further provides a multi-layer microfluidic chip for carrying out a multi-step process including at least two layers, a fluid layer and an electromechanical layer. Fluids between the two layers can communicate through one or more through holes, preferably vertical holes. The fluids can travel from the fluid layer to the electromechanical layer, and back, through one or more fluid jumpers in the electromechanical layer. Components such as micro-valves or pumps can integrated with the jumpers as well. A valve, for example, may be operated by selectively collapsing a wall of a jumper through actuation such as pneumatic, magnetic, thermal, and/or piezoelectric actuation.

Still another embodiment of the present invention performs a multi-step process by segregating system functions into constituent steps. A series of microfluid chips are provided, such as the multi-layer microfluidic chip, having fluid inlet and outlet ports, for example, on their periphery. Each of the individual microfluidic chips carries out a selective function or group of functions within the overall system. The chips may be combined, for example by placing them on a rigid substrate and connecting them using fluid connectors.

According to an exemplary method for producing a plurality of microfluidic systems, a plurality of functional units are provided, where each of the functional units are configured for performing at least one functional step in a microfluidic process. The functional units each have inlet and outlet ports in standardized locations, such as planar locations, so that an outlet port of a functional unit aligns with an inlet port of an adjacent functional unit. The plurality of functionally varying functional units is made available to an end user (for purchase, for example), so that one or more of the functional units forming the steps in a desired microfluidic system are selected by the end user. The selected functional units are arranged in a sequence, and the units are connected to combine the units and seal the inlet and outlet ports of connecting units. The functional units may be arranged horizontally, vertically, or a combination of horizontally and vertically.

Turning now to the figures, FIG. 1 shows a simplified layout of a conventional test chip 200 for a DNA sequencing process. The test chip 200 includes locations for performing various steps in the sequencing process, such as cell lysing 202, electrophoresis (EP) 204, PCR 206, and sequencing 208. Ports 210 and 212, such as input and output ports for reactants, agents, waste products, end products, etc. are contained on the chip. A series of channels 214 connect the locations 202, 204, 206, 208 of the chip 200.

The test chip shown in FIG. 1 is designed for a single particular task of interest, and has a planar, monolithic integration. However, though many such tasks require multiple, sequential steps, the steps of the DNA sequencing chip of FIG. 1, developed for one particular application, cannot be modified easily for other applications. Since many steps are involved, requiring a number of process elements to be designed and integrated onto the chip, development of the chip is often complicated and the development effort is expensive.

A particular chip may contain components such as microchannels, microreservoirs, microreaction cells, micropumps, microvalves, and microelectrodes. The development cycle of microfluidic chips is usually long and the cost is usually high, and thus a bottleneck is present for commercialization and wider utilization, because many functional steps embodied in such components must be integrated onto the chip, and a new set of mask layout and prototyping/fabrication processes must be performed for each unique chip.

To design a microfluidic system according to an exemplary method of the present invention, one first segregates or partitions a complex, multistep DNA sequencing function into a sequence of more simple constituent steps. The segregated or partitioned steps may be individual, simple steps (such as a single chemical reaction or fluid interaction) or groups of steps that may collectively be constituent steps in a microfluidic process. For example, for a DNA sequencing chip, the complex chip function can be broken down into at least the following sequential constituent steps: cell lysing, electrophoreses, sequencing, and polymerase chain reaction (PCR).

Figure 2:
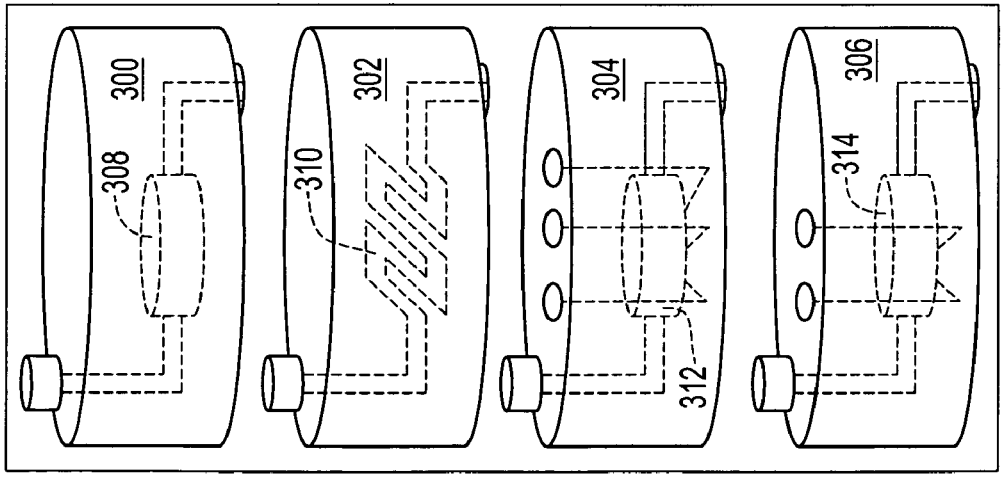
FIG. 2 is a schematic diagram of a number of functional units, according to an embodiment of the present invention.

A number of functional units 300, 302, 304, 306, shown by example in FIG. 2, are provided to perform each of the constituent steps. Each of the provided functional units 300, 302, 304, 306 is preferably configured to perform one of the constituent steps in a single, standalone unit, though it is contemplated that an individual functional unit may perform more than one constituent step. For example, the exemplary functional units 300, 302, 304, and 306 shown may be configured to perform cell lysing, electrophoresis (EP), sequencing, and PCR, respectively. Additionally, each of the functional units 300, 302, 304, 306 is configured to be arranged and combined, with fluid communication between the functional units, to form a complete microfluidic system.

For example, each of the functional units 300, 302, 304, 306 may be provided by selecting the functional units from a greater number of available standardized and prefabricated functional units. Although the function of a complex system typically cannot be standardized, it is possible to standardize individual functional units configured for performing common constituent steps in various chemical or biochemical processes. As such, standard functional units can be designed and prefabricated so that they are available individually, for example off-the-shelf.

Preferably, a set of functional units is fabricated and provided, each for performing a particular common process step. To provide the functional units 300, 302, 304, 306 for designing a specific microfluidic system, functional units at least for each of the steps described above are fabricated, for example, at a factory. The functional units 300, 302, 304, 306 preferably are part of a larger set of common functional units, so that a designer can select one or more functional units to perform the constituent steps of the overall microfluidic process. By using and selecting from such prefabricated functional units, the cost of development of a complex fluid chip may be substantially limited to the interaction of potentially inexpensive, interchangeable parts.

The functional units 300, 302, 304, 306 may contain one or more of various known biochemical or chemical elements 308, 310, 312, 314 on the chips for performing common steps in complex, multi-step processes. For example, the elements may include such items as: fluid channels, chemical reaction chambers, reservoirs for fluids or particles, mixers, pumps, or valves for biochemical or fluid interaction. Preferably, the functional units 300, 302, 304, 306 each perform an individual step in the total process. However, it is contemplated that the functional units 300, 302, 304, 306 each could perform a group of steps, particularly if certain steps are commonly grouped for particular microfluidic processes.

Figure 4:
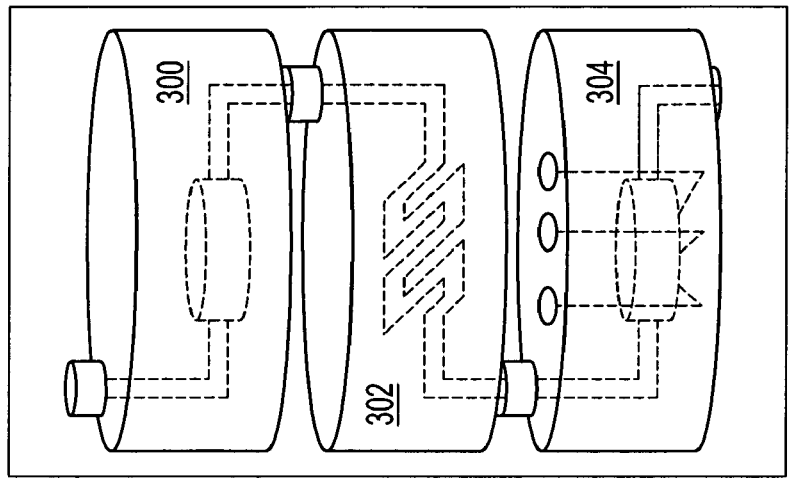
FIG. 4 shows an alternative arrangement of joined functional units.
Figure 3:
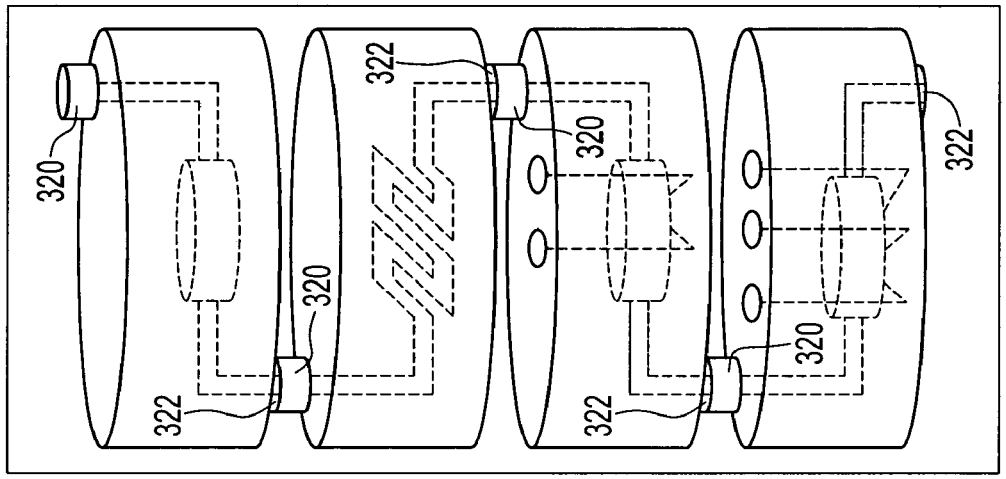
FIG. 3 is a schematic diagram of a number of joined functional units forming a microfluidic system.

As shown in FIGS. 3 and 4, the functional units 300, 302, 304, 306 are arranged in a vertical sequence (from top to bottom as shown in FIG. 3, 300, 302, 306, and 304) and combined to form a DNA sequencing system. Inlet ports 320 are aligned with outlet ports 322 of vertically adjacent chips so that fluid is communicated sequentially through the functional units 300, 302, 304, 306. Preferably, and as shown in FIG. 3, each of the inlet ports 320 are disposed at a predetermined, standardized location along surfaces (such as upper and lower surfaces, or vertical surfaces) of each functional unit 300, 302, 304, 306. Similarly, the outlet ports 322 are in a predetermined, standardized location on each functional unit 300, 302, 304, 306, and are disposed to align with a vertically adjacent inlet port 320 of an adjacent functional unit. In this way, regardless of the particular functional units 300, 302, 304, 306 chosen, or the particular sequential arrangement of the functional units, fluid communication is possible between the functional units. For example, in the alternative microfluidic system shown in FIG. 4, functional units 300, 302, and 304 are arranged in sequence vertically, and their respective inlet and outlet ports 320, 322 align to allow fluid communication.

Preferably, the functional units are fabricated by production in a factory, with various types of units being produced in significant (at least a plurality) quantities. A preferred method of fabricating functional units will now be described, though the concepts described herein are not intended to be limited to the particular fabrication processes described.

Figures 5A, 5B, 5C:
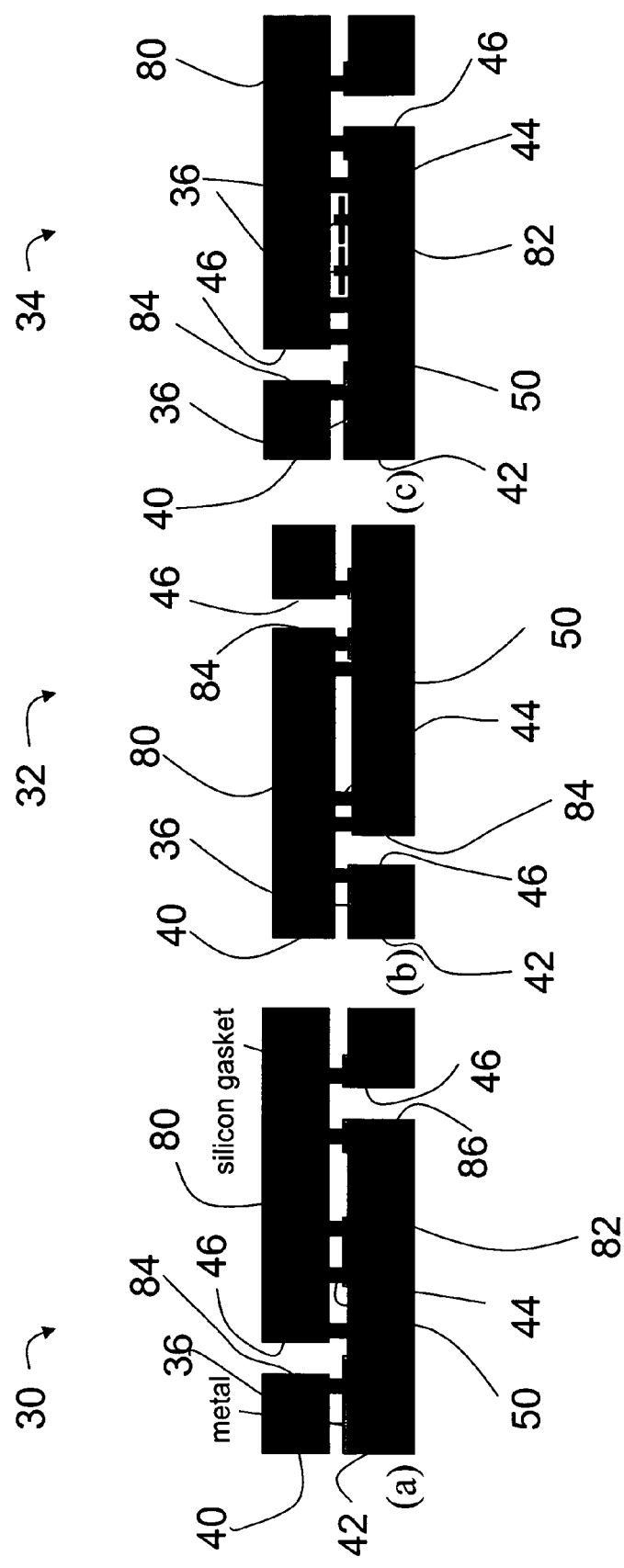
FIGS. 5A-5C show a number of exemplary functional units, according to an embodiment of the present invention.

FIGS. 5A-5C depict a number of exemplary functional units 30, 32, 34 according to an embodiment of the present invention. The functional units 30, 32, 34 as shown are representative of functional units that may be used in the art, and are intended to illustrate particular features present in certain embodiments of the invention. Each of the functional units 30, 32, 34 shown in FIGS. 5A-5C is designed to perform a single significant constituent step in a multi-step, complex function performed by a microfluidic system.

As shown in FIGS. 5A-5C, each of the functional units 30, 32, 34 contains a first (upper) plate 40 and a second (lower) plate 42, with a number of fluid channels 44 and the fluid processing elements 36 disposed on each plate and/or between the plates. The first and second plates 40, 42 are combined to form the complete functional unit. Both the first and the second plate 40, 42 are produced to contain at least one through hole 46 that can be used for a fluid inlet or outlet for the functional units 30, 32, 34. For example, the first plate 40 of the first functional unit 30 shown in FIG. 5A includes a first through hole 46 that functions as an inlet port for receiving a fluid from another, connected functional unit, or from outside the microfluidic system. The second plate 42 shown in FIG. 5A includes a second through hole 46 that functions as an outlet port for exiting a fluid. The planar locations of the through holes 46 along the surfaces of the plates 40, 42 are preferably standardized for each the functional units 30, 32, 34.

The process elements 36 integrated into the functional units 30, 32, 34 may vary and may include elements such as, but not limited to: chemically defined surfaces, fluid mixers, micropumps, microvalves, and/or microfluidic or particle reservoirs. One or more of these integrated microfluidic elements 36 may be fabricated on the first and/or second plates 40, 42 of each of the functional unit 30, 32, 34 using methods known for integrating such elements on a conventional microfluidic chip, for example, though other methods are possible.

For forming particular structures such as the fluid passages 44 or reservoirs, one or both of the first and second plates 40, 42 of each functional unit 30, 32, 34 may contain recess regions or ridges, which form fluid paths or reservoirs when the first and second plates are bonded. According to a preferred embodiment of the present invention, the watertight fluid passages 44 of the functional units 30, 32, 34 are fabricated by forming ridges 50 on one or more of the plates 40, 42, as shown in FIGS. 6A-6E and FIGS. 7A-7F using a fluid-phase precursor 52.

Preferably, the ridges 50 are formed by precise patterning of soft silicone material, such as polydimethylsiloxane (PDMS). However, materials that form elastic polymer from the fluid-phase precursors 52 may also be used, including polymers in the general room temperature vulcanized rubber (RTV) family of polymers. PDMS material is biocompatible, soft, and easy to process. However, PDMS cannot be photo-defined, and thus it has been difficult in some instances to form precise patterns with PDMS using conventional methods. Furthermore, the precursor of PDMS is relatively viscous. If the precursor is deposited by a spin-on process, for example, the thickness is typically greater than 40 micrometers, which may not be suitable. Preferred processes of the present invention provide methods of patterning the ridges 50 for producing water-tight seals and channels for fluids.

These preferred methods precisely pattern organic films for formation of structures. The process can be used for films that meet the following criteria: 1) the film is a polymer material that is formed by cross-linking of monomers; 2) the monomer solution exists in liquid phase; and 3) the polymer forms a soft material when cured (i.e. when it enters the solid phase), analogous to rubber in terms of elasticity. Elastomers (polymers that are relatively elastic materials, for example, materials with a modulus of elasticity comparable to rubber bands or O-rings) are preferably used.

In the preferred formation methods, the precursor 52 is poured into a formed recess 54. Generally, the precursor 52 is a polymer material that begins as a liquid phase and can be cured to form cross-linked, elastic solids. Preferably, the solid-phase polymer 56 is formed by cross-linking monomers with smaller molecular weights. The monomers are dissolved into the precursor material 52 that is frequently fluid in nature. By curing the precursor 52, cross-linking occurs and the material becomes a solid-phase polymer 56.

Referring first to FIGS. 6A-6E, a first embodiment of the formation process begins with providing a solid surface substrate 58. The substrate 58 may be, for example, the first or second plate 40, 42 of any of the functional units 30, 32, 34. The first embodiment forms a material on the solid surface 58 that can be precisely defined to create a mold and then selectively removed without removing the formed structure. Preferred types of materials for the solid surface 58 (including the first or the second plates 40, 42) include silicon, glass, and polymer substrates. Next, the recesses 54 are formed (FIG. 6A) on the solid surface 58. To form the recess 54 according to the first preferred method, an organic film 60, such as a photosensitive polymer (e.g., a photoresist) defines the mold that formed on the solid surface 58. For example, the photoresist 60 may be spun on top of the solid surface 58 and selectively removed to pattern the photoresist, thus forming the mold. The mold from the photoresist 60 can be defined precisely in terms of height and lateral dimensions using conventional microlithography technology, such as photolithography. The thickness of the structure (such as the fluid channel 44) is defined by the thickness of the mold, and the lateral dimensions of the structure are defined by the mold.

Figure 6A:
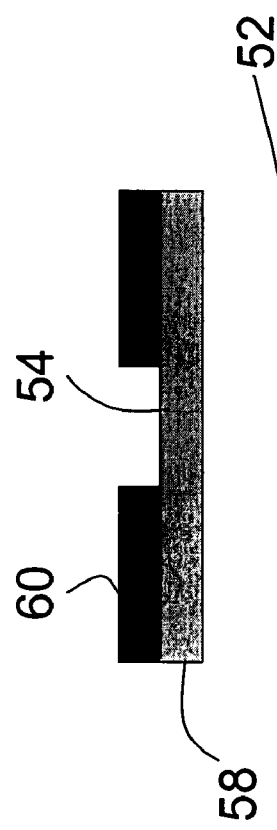
FIGS. 6A-6E show steps for forming a ridge between layers, according to an embodiment of the present invention.
Figure 6B:
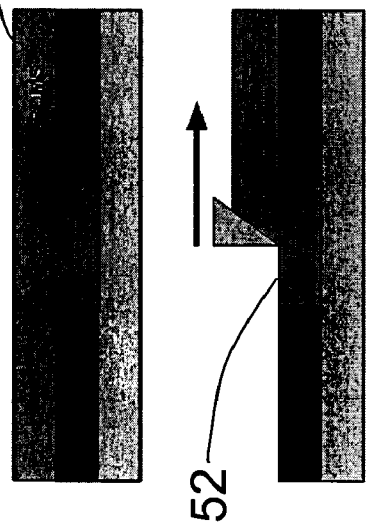
Figure 6C:
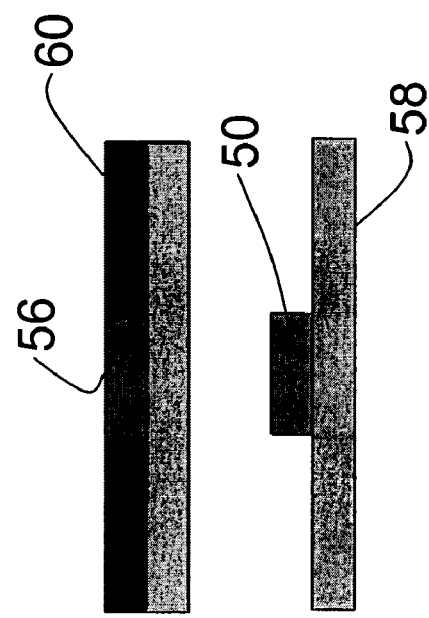
Figure 6D:
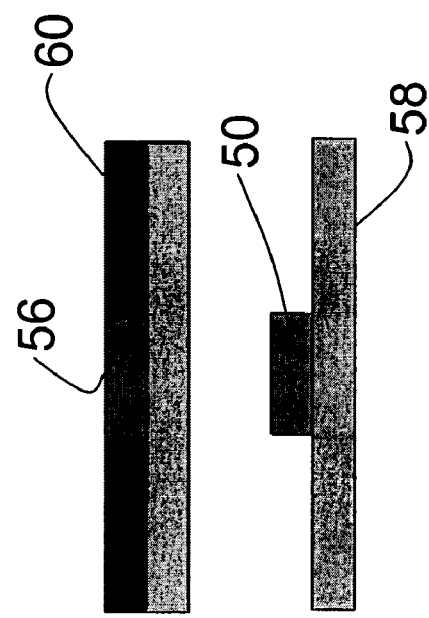
Figure 6E:
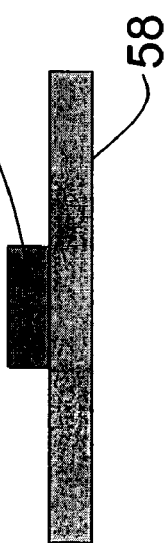

Next, as shown in FIG. 6B, the solid surface 58 covered by the photoresist 60 is flooded with the precursor 52, such as a PDMS precursor, which exists in a viscous liquid form. The polymer precursor 52 then is planarized, as shown in FIG. 6C, by surface scrubbing for removing excess materials. One method of planarization uses a sharp blade or a squeegee (not shown) that travels across a surface 62 of the photoresist 60 while maintaining contact with the surface. Next, as shown in FIG. 6D, the precursor 52 is cured, resulting in the solid material 56, a soft solid polymer matrix. The photoresist 60 material forming the mold can then be selectively removed, as shown in FIG. 6E, leaving the patterned ridge 50 behind, formed from soft materials.

The photoresist mold material 60, for example, may be removed using acetone, which does not attack the cured silicone (PDMS) elastomer material 56. The thickness of the resulting PDMS ridge 50 is defined by the thickness of the photoresist mold 60.

In an alternative method of forming the ridges 50 on the solid surface 58, shown by example in FIGS. 7A-7F, a single substrate material is used, without formation of the mold material 60. The solid surface substrate 58 is provided, as shown in FIG. 7A, and recess regions 54 are made directly into the substrate, as shown in FIG. 7B. The solid surface substrate 58 is patterned to etch the surface in selected regions and form the recesses 54. If the substrate 58 is silicon, for example, the recesses 54 can be formed by at least wet anisotropic etching, plasma etching, or reactive ion etching. If the substrate 58 is glass, the recess 54 can be formed at least by using wet etching (liquid phase etchant) or plasma etching. If the substrate 58 is polymer, the recess 54 can be formed by using, for example, mechanical imprint, injection molding, reactive ion etching (RIE), or plasma etching.

Next, as shown in FIG. 7C, the solid surface is flooded with the precursor (monomer solution). For example, the fluid-based precursor may be poured over the entire solid surface. The formed recesses are filled in by the precursor. The excessive material is then scraped off (FIG. 7D), for example, by planarizing a surface 64 of the solid surface 58 using a blade or squeegee. As shown in FIG. 7E, the polymer precursor 52 is then cross-linked by curing the polymer, resulting in the solid phase material 56, a soft solid polymer matrix. The solid surface substrate 58 then is etched from the front side to a specific height, as shown in FIG. 7F. The etching method etches the substrate material of the solid surface 58 at a rate much higher than the etch rate of the solid-phase polymer 56. As a result, the elastomer ridge 50 is formed that has a height corresponding to the depth of the etch of the solid substrate 58.

After forming the ridges 50, etching recesses, and/or forming the process elements 36 on one or more of the constituent first and second plates 40, 42, the functional units 30, 32, 34 are preferably formed by joining the first and second plates. This joining or bonding may be temporary (for example, clamps (not shown) may be used to hold the first and second plates 40, 42 together), or permanent (in the case of permanent bonding, for example by adhesive (not shown)). As shown in FIGS. 8A and 8B, for example, an upper plate 70 and a lower plate 72 are combined so that the upper plate covers the lower plate. Preferably, the upper and lower plates 70, 72 have similar (and preferably standardized) planar dimensions so that the plates fit together form a complete functional unit 74.

Preferably, the upper and lower plates 70, 72 are subjected to pressure during bonding, which may be provided by clamps (not shown), for example. In this way, the ridges 50 on the upper and/or lower plates are slightly deformed due to the pressure created during joining of the plates 70, 72 to form a tight fluid seal. The joined plates 70, 72 thus form at least one of the sealed fluid channels 44 within the complete functional unit 74, and defined at least by the pairs of formed ridges 50 (defining the lateral boundary), the lower plate 72, and the upper plate 70. For example, as shown in FIGS. 8A and 8B, the ridges 50, the upper plate 70, and the lower plate 72 define flow channels 44 combining to form a generally "T" shape, and terminating in three flow inlet/outlets 76. The channels 44 are sealed by the pressure created when joining the plates 70, 72. It will be understood that the fluid channels 44 depicted are for purposes of illustration only, and should not be taken as limiting the fluid channels to a particular location or configuration.

Referring again to FIGS. 5A-5C, it is preferred that the location of the through-hole 46 in the first plate 40, forming a fluid inlet 84, is disposed at a standardized location along an upper surface 80 of the functional units 30, 32, 34, according to a planned design. The through hole 46 of the second plate 42, forming a fluid outlet 86, also is disposed at a standardized location along a lower surface 82 of the functional units 30, 32, 34. However, the first and second plates 40, 42 may be oriented in different directions, and may need to be aligned so that one or more of the inlet and outlet ports 84, 86 overlap with those of adjacent functional units 30, 32, 34 when the functional units are combined, for making a fluid connection between the functional units.

As shown in FIGS. 9A-9B, the provided functional units 30, 32, 34 are vertically arranged to form complete microfluidic chips 90, 92 typically by stacking the functional units on top of one another in a particular sequence to create a group of functional units arranged sequentially by process steps. Preferably, the functional units 30, 32, 34 are arranged vertically, as shown in FIGS. 9A-9B. However, it is contemplated that other arrangements for the functional units 30, 32, 34 are possible, and that the units may be arranged in other ways. For example, the fluid inlets and outlets 76 shown in FIGS. 9A-9B may connect with one or more functional units placed side-to-side with the one shown. In this case, it is preferred that, again, the locations of inlet and outlet ports along surfaces are standardized for alignment and fluid communication. Preferably, the surfaces 80, 82 of the functional units 30, 32, 34 are of substantially similar planar dimensions so that they stack evenly, but this is not required. However, again, it is preferred that the inlet ports and outlet ports 84, 86 of successive functional units can be aligned to communicate with one another through standardization of the location of the inlet and outlet ports along the surfaces 80, 82 of the functional units 30, 32, 34 to allow fluid communication between constituent steps of a complex, multi-step process. Other embodiments and methods for allowing fluid communication between the combined functional units 30, 32, 34 are contemplated.

The functional units 30, 32, 34 may be selected and arranged in a variety of combinations or permutations to form the various microfluidic chips 90, 92. For example, FIGS. 9A-9B show two different microfluidic chips 90, 92 formed by different permutations of the functional units 30, 32, 34 shown in FIGS. 5A-5C. In FIG. 9A, the microfluidic chip 90 contains the functional units 32, 34, 30 ordered from top to bottom, while the microfluidic chip 92 of FIG. 9B contains the functional units 30, 32, 34 ordered from top to bottom. It is contemplated that any number of the functional units 30, 32, 34 may be selected, arranged, and combined to form the microfluidic chips 90, 92.

It is preferred that the junction formed by aligned inlet and outlet ports 84, 86 of the arranged (stacked) functional units 30, 32, 34 are sealed with O-rings 96 to provide a sealed fluid passage between the combined functional units. Using the same or similar methods to those shown in FIGS. 6A-6E or FIGS. 7A-7F for forming the ridges 50, one can form the O-rings 96 to seal the junction created between the interconnecting inlet and outlet ports 84, 86 of two adjacent functional units 30, 32, 34.

An exemplary process for forming a seal with the O-ring 96 is shown in FIGS. 10A-10B. In FIG. 10A, the O-ring 96 is formed as an annular ridge and disposed to surround one of the mating inlet or outlet ports 84, 86. The O-ring 96 extends downwardly from the outlet port 86 of the second plate 42 of a top functional unit. It will be appreciated that the O-ring 96 can alternatively be formed to extend upwardly from the inlet port 84 of the first plate 40 of a bottom functional unit. The O-ring 96 is preferably of the soft elastomer type. As shown in FIG. 10B, the plates 40, 42 of the functional units 30, 32, 34 are bonded together (for example, clamped). This creates at least partial deformation of the O-ring 96 and thus forms a leak-tight seal between the outlet port 86 and the inlet port 84. Similar O-rings 96 can be formed and disposed between multiple functional units 30, 32, 34, or at multiple locations between a pair of functional units (if more than one outlet port 86 or inlet port 84 is contained on a single functional unit, for example). The O-rings 96 may also be formed within the functional units 30, 32, 34 to seal other fluid elements, such as channels or reservoirs.

Figures 34, 35A, 35B:
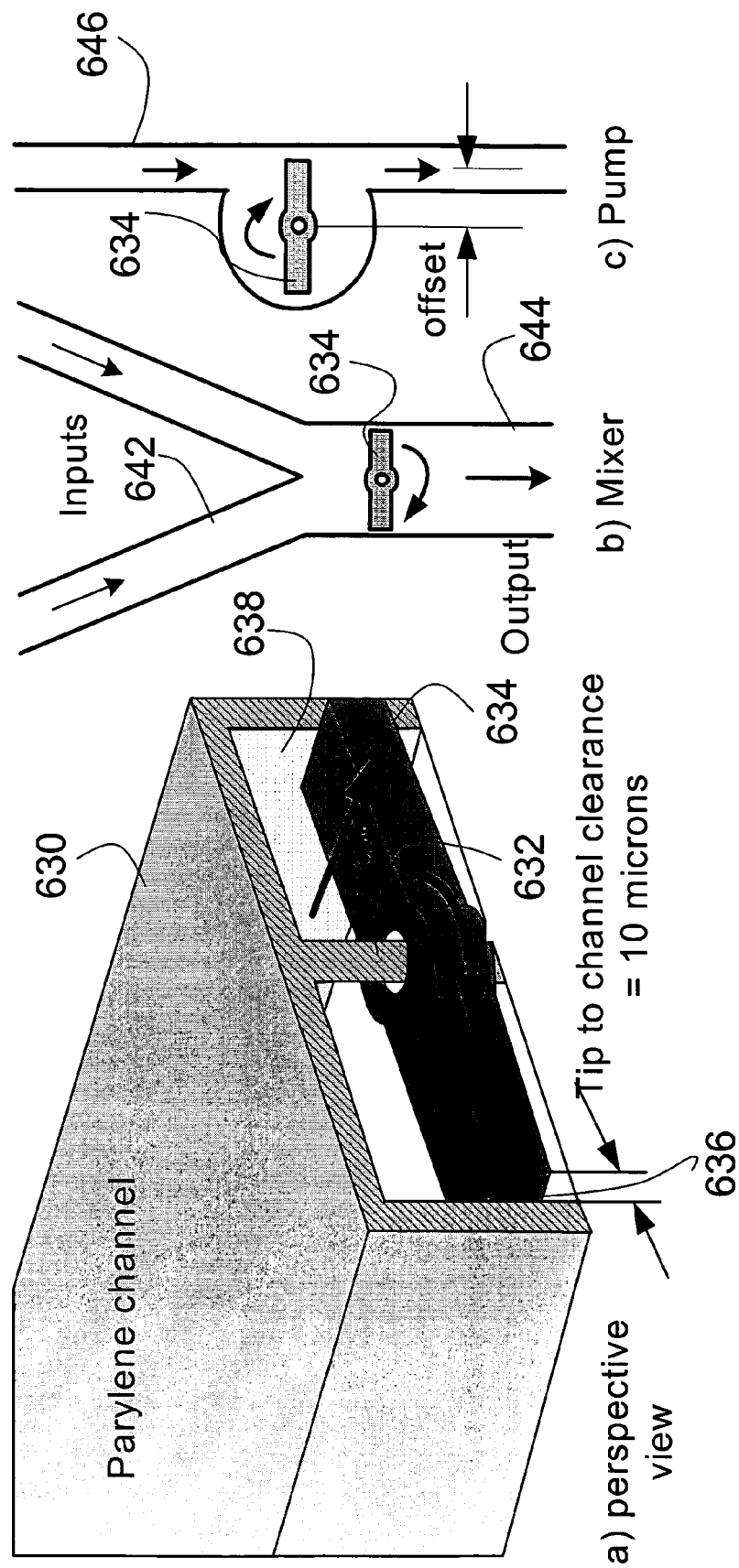
FIG. 34 shows a magnetic stirrer, according to another embodiment of the present invention.
FIGS. 35A-35B show a mixer and a pump, respectively, using a magnetic stirrer, according to another embodiment of the present invention.

As shown in the fully-formed microfluidic chips 90, 92 shown in FIGS. 9A-9B, the complete microfluidic systems preferably have at least an initial inlet port 98, formed by the inlet port 84 of the top functional unit (32 in FIGS. 9A and 30 in FIG. 9B), and a final outlet 100 (formed by the outlet port 86 of the bottom functional unit (30 in FIGS. 9A and 34 in FIG. 9B). Accordingly, the chips 90, 92 can receive samples for a complete multi-step process, or can receive an input as part of a larger process.

In a preferred design method, the fabricated functional units 30, 32, 34, 300, 302, 304, 306 that are joined to form microfluidic chips are standardized so that functional units are produced for a number of known constituent steps for typical complex, multi-step chemical or biochemical processes. These functional units 30, 32, 34, 300, 302, 304, 306 can be prefabricated, off-the-shelf, ready-to-use chips for selecting and joining in various combinations or permutations to create modular microfluidic chips for a variety of complex, multi-step functions. The modular functional units 30, 32, 34, 300, 302, 304, 306 may be provided as commercially available components that are prepared by dedicated foundries and may be purchased for low cost and with fast turnaround time by users and developers of microfluidic systems. Preferably, a limited number of variants of types of the functional units 30, 32, 34, 300, 302, 304, 306 are produced. Though the number of potential combinations or permutations likely increases along with the number of different functional units 30, 32, 34, 300, 302, 304, 306, it is preferred that only common, standard individual functions are embodied in functional units that are mass produced for off-the-shelf use. For example, the functional units 30, 32, 34, 300, 302, 304, 306 may be designed and fabricated for process steps used in a plurality of microfluidic processes.

Furthermore, it is preferred that commonly encountered modular functional units 30, 32, 34, 300, 302, 304, 306 are defined and prepared under at least one interconnect and package standard. The function and dimensions of such produced functional units 30, 32, 34, 300, 302, 304, 306 are made available to end users through packaging or publishing specifications for the functional units, for example.

For the DNA process, for example, the individual standardized functional units 300, 302, 304, 306 can be formed for the various steps in DNA sequencing. In a preferred design and fabrication method, each of these functional units 300, 302, 304, 306 has inlet and outlet ports and these ports are disposed in standard locations on the surfaces of each functional unit so that the ports align and overlap when the functional units are joined (stacked as shown in FIGS. 3 and 4, for example). In this way, fluid communication is possible between each of the functional units 300, 302, 304, 306 and a complete chemical or biochemical microfluidic sequence is performed by the combined chip.

A number of kits may be provided, containing sets or subsets of the modular functional units 300, 302, 304, 306. Individual functional units may be produced, selected, and purchased separately as well, with standardized sizes and locations for inlet and outlet ports. Functional units produced by dedicated foundries are contemplated, having commercially available standardized sizes and functions, etc. Commercial entities are contemplated to develop, catalog, and distribute modular functional units with varying functionalities and design. Economies of scale allow reduced cost and utilization of microfluidic laboratories on a chip.

In addition to providing microfluidic systems that are biocompatible with fluids to be introduced into the systems, it may be beneficial for the microfluidic systems to be capable of relatively sophisticated functionality such as pumping and valving, yet also be portable, inexpensive, and require relatively low power to operate. Easily fabricated and/or customizable microfluidic systems are also desired.

However, it has been difficult to integrate important microfluidic components, such as pumps and valves, into microfluidic systems. One reason for this is that microfluidic components typically are built on a single plane, which complicates material and fabrication issues. Accordingly, it is difficult for end users to obtain custom functional chips inexpensively. Furthermore, end users typically do not have access to fabrication or customization resources for microfluidic systems, such as materials or equipment for microlithography and microfabrication.

For a microfluidic system to be successfully implemented, it is typically required that the material be biologically or chemically compatible with chemistry or fluids. For example, if electro-osmosis pumping is used to transport fluids, it is ideal to use channels made of glass. It is desirable that the channels be formed by soft-bonding, as the channel walls are not subjected to harsh conditions of so-called hard-bonding, for example, using high temperature or electric fields. It is further desirable that the fabrication process and design be as simple as possible, to reduce the cost of development and enable end users of microfluidic systems to produce chips on site. Furthermore, it is desirable that the size of the overall microfluidic system (which may include more than the microfluidic chip itself) should be as small as possible to allow portable applications.

In another preferred embodiment of the present invention, an architecture of microfluid devices and systems is provided that includes at least two dedicated primary layers. A first dedicated layer, referred to as a fluid layer, includes a number of fluid channels and/or areas for chemical reactions. A second dedicated layer, referred to as an electromechanical layer, includes integrated components for fluid reaction, movement, sensing, etc. The electromechanical layer preferably also includes a number of through-wafer holes that align with one or more of the fluid channels or chemical reactors of the fluid layer, though the through holes may instead be in a separate layer. The electromechanical layer components may include, but are not limited to, sensors, actuators, electrodes, optical receivers, and other optical components.

Conventionally, it has been difficult to integrate electromechanical components with fluid components of a microfluid system, due to inherent problems of surface roughness resulting from the inclusion of the electromechanical components. To address this problem, and other concerns, a preferred electromechanical layer of the present invention includes electromechanical components that are formed on one side of the electromechanical layer, which otherwise would incur surface roughness and may cause difficulty in subsequent bonding processes. The electromechanical components may be formed, for example, through surface micromachining. A relatively flat surface on the opposing side of the electromechanical layer allows bonding to the fluid layer. The microfluid system is formed by bonding the fluid layer with the electromechanical layer, with proper registration, so that the fluid layer contacts the relatively flat side of the electromechanical layer (the side not having protruding electromechanical components). In this way, fluid channels and chemical reaction spaces are preferably on a different physical level than the electromechanical elements. The electromechanical elements and the fluid channels and chemical reaction spaces are connected for fluid communication using the through-wafer holes, which are preferably vertical holes extending through the electromechanical layer.

In a preferred embodiment, the fluid layer is made by molding PDMS or other elastomer materials, such as by pouring liquid precursors on a substrate with reverse features of fluid channels. After the elastomer is cured, the precursors are peeled off. The reverse features on a substrate can be made with methods such as, but not limited to, photolithography, ion etching, electroplating, for example, in a factory. Alternatively, these reverse features can be formed from solid or semi-solid materials applied manually, such as via a nozzle applied by an end user wishing to customize a particular microfluid system.

By allowing the reverse features to be applied manually, the needs of using photolithographic equipment are substantially reduced or eliminated. This manual application method enables biologists and chemists, for example, without access to clean rooms and photolithographic equipment, to make fluid layers inexpensively. Possible materials to form a reverse mold manually include, but are not limited to, toothpaste, epoxy, and wax. In an exemplary manual application method, certain materials can be applied using a fine nozzle with pressure applied. The movement of the nozzle relative to a substrate thus determines the pattern.

A preferred embodiment of the electromechanical layer is formed from silicon. Electromechanical elements are preferably formed on the back side of the electromechanical layer by surface micromachining techniques. For example, a microfluid valve having surface micromachined membranes that can be formed individually can be made as part of the electromechanical layer. Alternative materials for the layer include, for example, glass and plastics.

Accordingly, it is possible for the fluid layer and the electromechanical layer to be manufactured separately, thus reducing the cost and expertise related to making customized fluid chips. This also can potentially reduce the cost of design and manufacturing. While the fluid layer may potentially be made inexpensively by end users, the electromechanical layer may instead be made by, for example, a foundry skilled in micromachining and microelectronics. The electromechanical layer may be standardized, with electromechanical components in standard locations, so that it may be mass produced and incorporated into a customized microfluidic system through an end user customizing the fluid layer.

Figure 11:
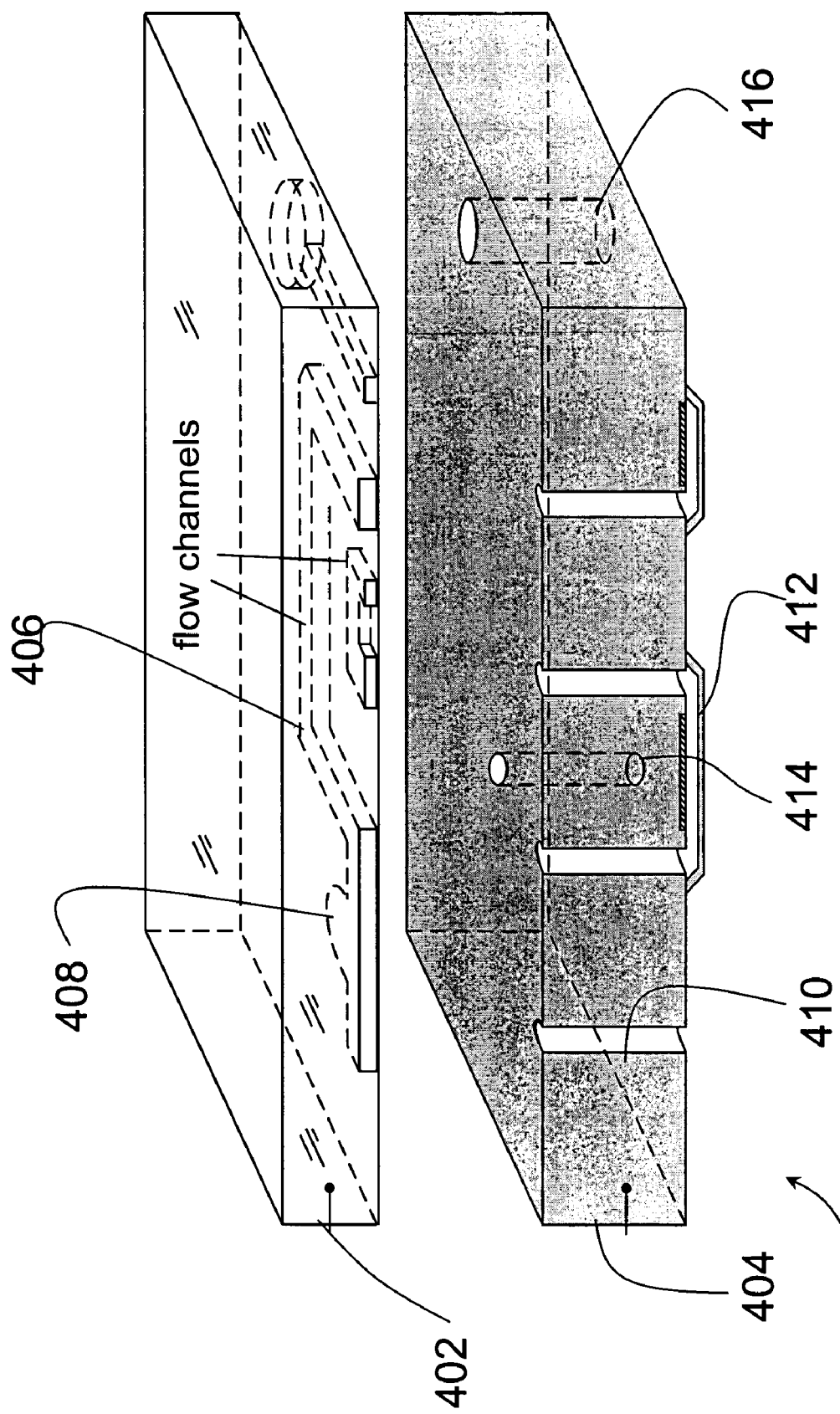
FIG. 11 shows a fluid layer and an electromechanical layer, according to an embodiment of the present invention.

FIG. 11 shows an example of a two layer microfluid system 400, including a fluid layer 402 and an electromechanical layer 404. As shown, the dedicated fluid layer 402 includes a plurality of flow channels 406 for the fluid and one or more chemical reaction spaces 408, which are formed in the fluid layer. Preferably, as shown in FIG. 11, the fluid layer 402 does not contain electromechanical components.

The dedicated electromechanical layer 404 includes a number of through-holes 410 vertically extending through the electromechanical layer, and a number of electromechanical components 412 formed on the back side of the electromechanical layer. The electromechanical layer also includes an inlet port 414 and an outlet port 416 for delivering fluid to and from the microfluidic system 400. Preferably, the electromechanical layer 412 does not contain the chemical reaction spaces 408, and more preferably does not contain the flow channels 406 as well.

Figure 12:
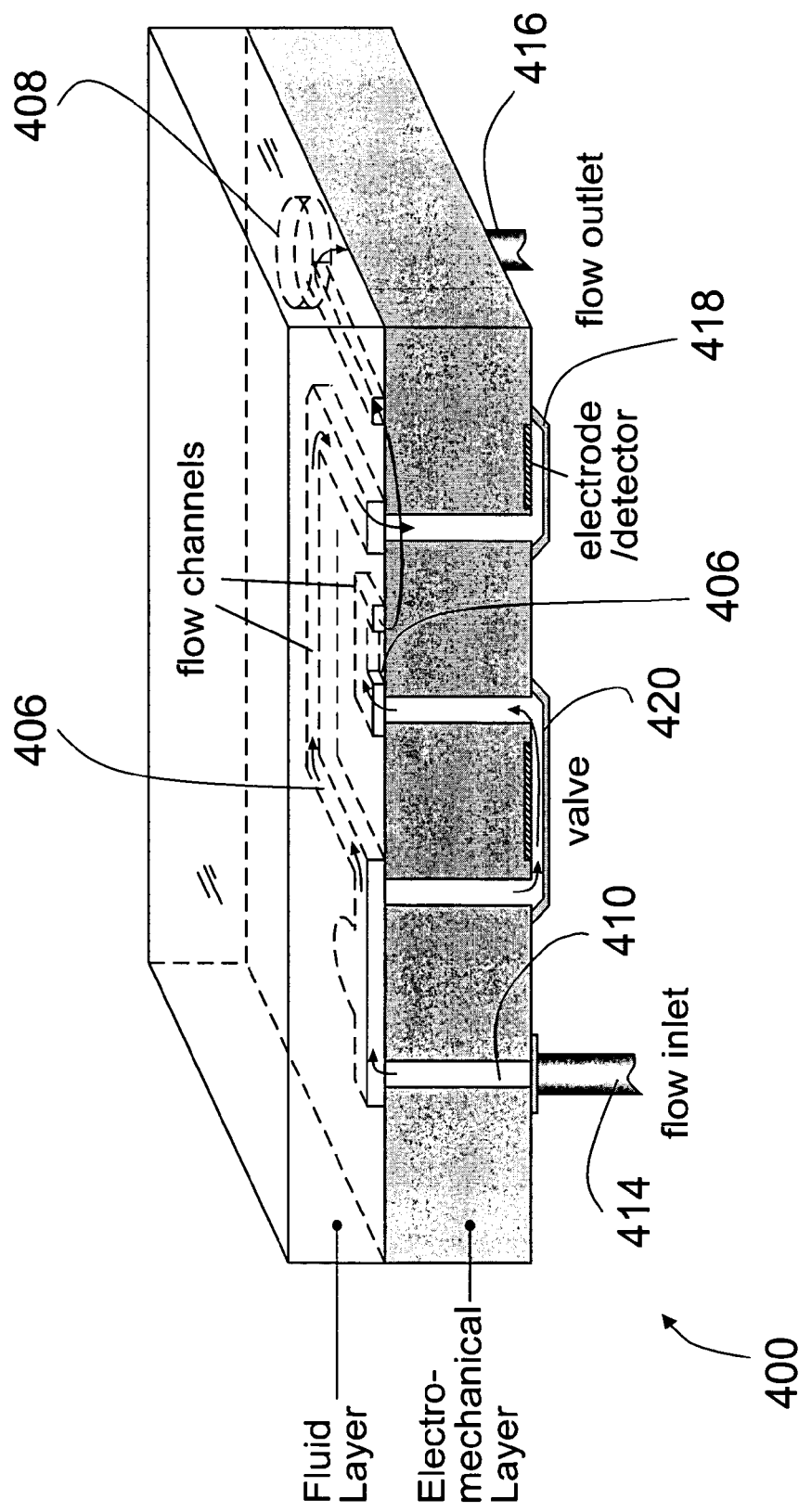
FIG. 12 shows an assembled microfluidic system formed by joining the layers of FIG. 10.

FIG. 12 shows the assembled microfluidic system 400, in which the flow channels 406 are registered with the through-holes 410 of the electromechanical layer 404. In operation, one or more fluids may be introduced through the flow inlet 414, through the through-hole 410 and the flow channels 406, through an electrode detector 418, to the reaction chamber 408, and finally through the flow outlet 416.

The electromechanical layer may include one or more valves 420 for selectively rerouting the fluid through an additional one of the flow channels 406, for example to direct the fluid to or away from one or more particular electromechanical elements. The complete microfluidic system shown in FIG. 12 may be assembled, for example, by bonding the fluid layer and electromechanical layer either permanently or reversibly. The electromechanical layer may include, for example, electrodes, sensors, actuators (such as, but not limited to, pumps and valves) and interconnects.

Preferably, the electromechanical layer includes a number of the through-holes 410 for fluid communication, so that, viewed from the top side, the electromechanical layer is perforated. In an exemplary method of manufacturing the electromechanical layer 404, deep (for example more than 500 µm) and small (for example less than 20 µm diameter) through-holes can be made by deep reactive ion etching (DRIE). The back side of the electromechanical layer as shown in FIG. 12 contains miscellaneous fluidic and electrical components. The front side of the electromechanical layer 404, as shown in FIG. 11, preferably does not host extraneous components and remains substantially or completely flat for providing a fluid seal after assembly.

The fluid layer 402 contains one or more microfluidic channels 406 recessed into its substrate. These channels preferably are spatially registered with the location of the through-wafer holes 410 in the electromechanical layer 404. The bottom side of the fluid layer 402, containing the recessed channels 406 and chambers 408, contacts the front side of the electromechanical layer 404, which is flat.

In this way, the multi-piece configuration allows a clean separation of chemical and biological functions (in the fluid layer 402) and the sensor and actuator functions (in the electromechanical layer 404). The layers 402, 404 are preferably based on different materials, and are fabricated separately. Preferably, the fluid layer 402 is based on a material that provides ease of fabrication and biochemical capability, such as, but not limited to, silicone elastomer. The electromechanical layer 404 is based on a material that allows a variety of sensors and actuators to be made, such as, but not limited to, silicon. This embodiment leverages the advantages of soft lithography for organic materials (in the fluid layer 402) and micromachining on silicon (for the electromechanical layer 404). It is thus also possible for the fluid layer to be made by end users or commercial services relatively rapidly and inexpensively. The electromechanical layer 404 may be made by microfabrication foundries, for example. Preferably, the electromechanical layer 404 is based on standard designs to realize economy of scale for foundries. This enables the separation of the end user and the developers in the formation process. This also allows maximization of flexibility for end users and manufacturability and economy for developers.

In an example of bonding, the layers 402, 404 may be packaged reversibly. In other words, the chip can be, for example, chemically treated before bonding, or can be de-bonded for chemical treatment if necessary. Furthermore, as the fluid layer 402 and the electromechanical layer 404 preferably contact one another over a largely flat region it is easier to form reliable, simple, and relatively leak-free bonds. In this way, fluids traversing the channels 406 will not cross-contaminate. Still further, because the fluid inlet 414 and fluid outlet 416 of the entire microfluidic system 400 can be preferably anchored reliably on the electromechanical layer, which is a hard substrate, it is easier to establish reliably a fluid interface between the microfluidic system and external locations.

FIGS. 13A-13D and 14A-14G show steps in a preferred fabrication process for both the fluid layer 402 and the electromechanical layer 404. An advantage for a preferred embodiment of the microfluidic system 400 is that the fabrication process for the fluid layer 402 and the electromechanical layer 404 are individually based on established, robust fabrication processes. In a preferred method for fabricating the fluid layer 402, a substrate 430 is provided from a silicone elastomer, such as, but not limited to, PDMS. Recessed regions 432 for forming the channels 408 and chemical reaction chambers 410 are made by molding off a surface of the substrate 430. For example, the rigid substrate, such as silicon (FIG. 13A) is processed to produce reverse surface features to correspond to the flow channels 408 or the reactors 410, as shown in FIG. 13B. For example, the reverse surface features 432 can be made of patterned photoresist or etched silicon ridges. Alternatively, the reverse surface features 432 can be formed by application of materials such as toothpaste, wax, etc., via a nozzle, for example, by moving the nozzle relative to the fluid layer. This allows end users to customize the fluid layer configuration without requiring microfabrication.

Next, a precursor of a silicone elastomer 433 is poured over the front surface of the mold formed by the substrate 430 and the reverse surface features 432 (FIG. 13C). After curing, the silicon elastomer 433 is peeled off the mold (FIG. 13D) to provide the fluid layer 402. Preferably the mold can be reused.

A silicon elastomer such as PDMS is preferred, as it is biochemically compatible with fluids to be introduced, easily obtained, and allows a relatively easy molding process as long as a molding substrate is provided. Furthermore, a PDMS material is transparent, allowing simple optical observation of fluid inside channels. Also, the PDMS material is soft, and therefore helps to form a leak-free seal with the electromechanical layer 404. However, it is contemplated that the fluid layer 402 may be made from other materials, such as, but not limited to, glass, pyrex, or silicon. With these alternative materials, recessed flow channels 408 may be formed by etching glass (using hydrofluoric acid) or silicon (using wet and antisotropic etchants, isotropic etchants, or plasma etching).

The electromechanical layer 404 (FIGS. 14A-14G) preferably is made of silicon. In a preferred process for making the electromechanical layer 404, beginning with a silicon wafer 440, a silicon dioxide thin film 442 is grown. The bottom side of the wafer 440 is patterned using optical photolithography, for example. As shown in FIG. 14C, the thin film 442 is etched from the back side. Preferably, the etch rate of silicon dioxide and silicon in a DRIE system may reach 1:100 selection ratio or lower. The DRIE process shown in FIG. 14D to produce the through-wafer holes 410 essentially stops when the front side silicon oxide 442 is reached, thus leaving a thin membrane exposed. In this way the process selectivity enables robust process control to compensate for non-uniformity. As long as the size of the formed through-hole 410 is sufficiently small (for example, less than 500 μm in diameter), the membrane 442 is mechanically strong enough to sustain subsequent surface micromachining processes to produce electromechanical elements. An electromechanical element 444 is formed by introducing a sacrificial layer 443, such as a photoresist (FIG. 14E), and forming the electromechanical element over the sacrificial layer (FIG. 14F). Structures on the front side after the surface micromachining process can be produced as desired.

If necessary, it is possible to etch the oxide 442 selectively from the through-wafer access hole (FIG. 14G) to produce the through-wafer holes 410 and remove the photoresist 443. Though the through-wafer holes 410 may increase the dead volume of fluid, this typically is not a significant concern for particular applications, as the dead volume attributed to the through-wafer holes can be sufficiently minimized.

If silicon is used as the substrate 440 for the electromechanical layer 404, the process for etching deep and high aspect ratio through-holes in the silicon is relatively established. For example, a DRIE machine using Bosch process is available for etching through-wafer holes with an aspect ratio of, for example, 50:1 to 100:1. It is also contemplated that vertical through-holes can be made in other materials, such as glass (using ultrasonic drilling, for example) or metal (using electrode discharged machining (EDM)). Other processes for forming the layers 402, 404 are possible.

Another motivation for using silicon is that silicon is a conventional material for microelectromechanical (MEMS) sensors and actuators. Accordingly, a developer of the electromechanical layer preferably can incorporate established processes and materials if silicon is used. Furthermore, materials that require a high temperature to deposit or cure will not affect the materials used in the fluid layer 402, which may be sensitive to extra chemical treatments and high temperature processing.

With the fluid layer 402 and electromechanical layer 404 formed, the two layers are bonded together (FIG. 15). For example, if the front side of the fluid layer 402 is made of silicon elastomer, and the back side of the electromechanical layer is made of silicon, the two pieces can be reversibly soft-bonded. Soft bonding with moderate applied pressure preferably prevents leakage of fluids between embedded channels and chambers. Alternatively, the layers 402, 404 may be permanently bonded by treating the silicone elastomer of the fluid layer 402. If instead, the fluid layer 402 is made of glass or silicon, the two pieces can be soft-bonded (taking care to allow a reliable seal), permanently bonded, or bonded using, for example, an elastomeric agent.

Fluid components, including channels and reactors, can be custom designed for use on a standard electromechanical layer, which may also be referred to as a microfluidic breadboard, incorporating sophisticated pumping, valving, and sensing capabilities. This standard electromechanical layer can be mass produced in foundries. Preferably, the fluid layer can be created using PDMS, typically requiring a straightforward process, without a clean room environment.

In an alternative embodiment, utilizing two-layer PDMS machining, an electromechanical layer may include multiple layers, including a control layer with electromechanical components, and an interconnect layer, such as a silicon breadboard, having a plurality of through-wafer interconnects. For example, utilizing two-layer PDMS machining, the control layer may include, for example, pneumatic fluid valves and pumps that direct liquid flow through fluid jumpers that connect to through-wafer channels of the interconnect layer. The interconnection layer, such as a silicon wafer, with the through-wafer interconnect channels may be sandwiched between the fluid layer and the PDMS control layer. Thus, as opposed to the microfluidic system 400 in which the electromechanical layer is a monolithic piece, such as silicon, the electromechanical layer is itself divided into a PDMS control layer and a silicon interconnect layer.

Figure 16:
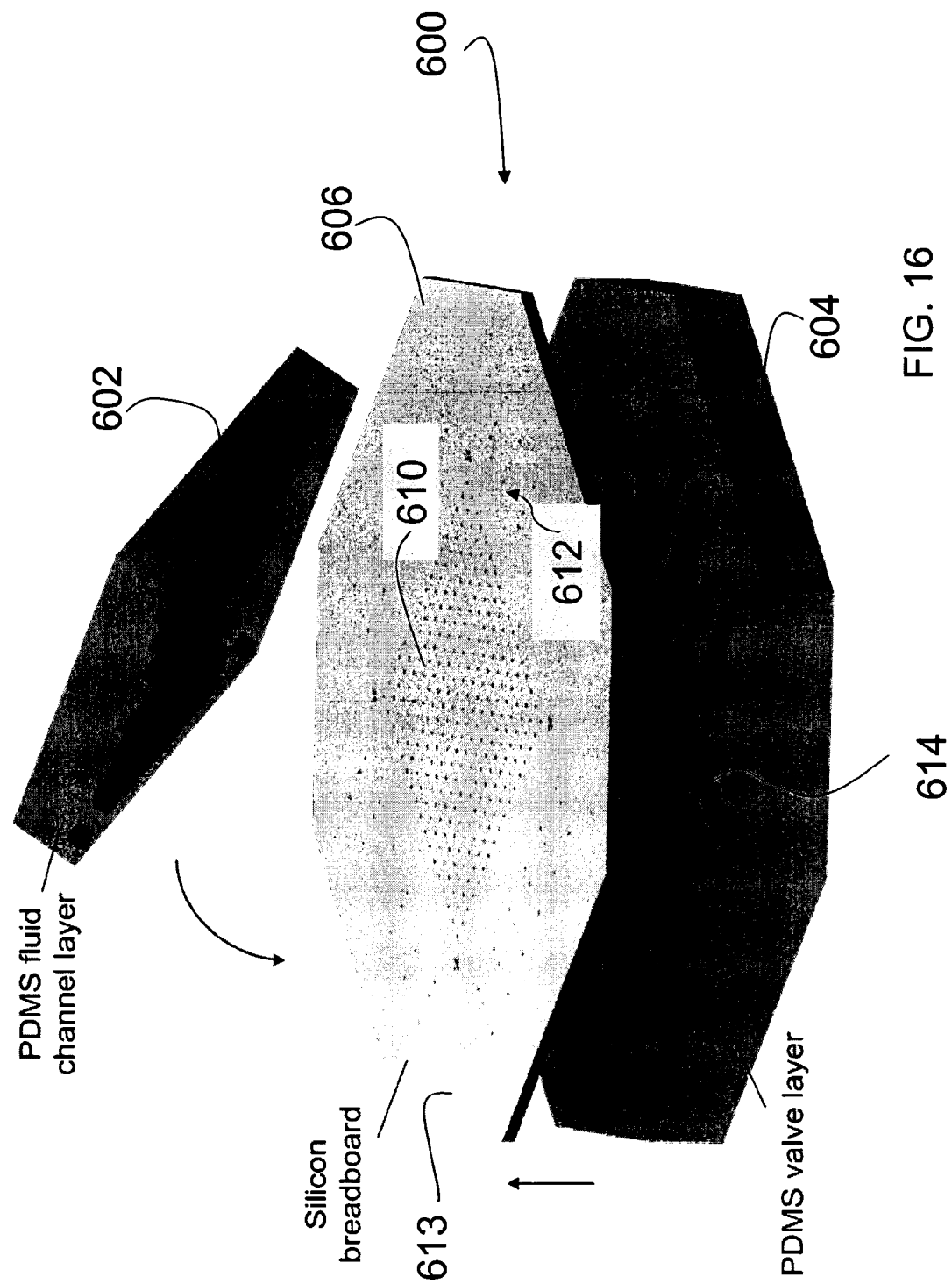
FIG. 16 shows a three-layer microfluidic chip, according to another embodiment of the present invention.

An example of such a configuration is shown in a three-layer microfluidic system 600 in FIG. 16. As shown, a dedicated fluid layer 602, preferably made of PDMS and including a number of fluid channels and reaction chambers but no electromechanical components, and a dedicated electromechanical layer 604, also preferably made of PDMS and including a number of electromechanical components but preferably without reaction chambers and flow channels, together sandwich a silicon breadboard 606, containing a plurality of through-holes 610.

In the example shown in FIG. 16, the fluid layer 602 is configured to align with an interconnect area 612 of the silicon breadboard 606, and the silicon breadboard further includes a number of outer through-holes 613 to align with inlet and outlet ports 614 of the PDMS electromechanical layer 604. In this way, the assembled microfluidic system 600 allows customization of the fluid layer 602, and relatively simple assembly, as shown in FIG. 16, while allowing both portability and access to the inlet and outlet ports 614 via the through-holes 613. Shrinkage of the PDMS material during thermal curing may be considered for proper registration of the channels of the fluid layer 602 to the through-wafer holes of the silicon breadboard 606. Similarly, PDMS shrinkage may be considered for the molded PDMS fluid layer 604.

As in the fluid layer 402 above, the fluid layer 602 is preferably created using PDMS molding. The electromechanical layer 604 is preferably formed using two-layer PDMS machining. An exemplary method to form components in a PDMS layer is disclosed in T. Thorsen, Sebastian J. Maerkl, and Stephen R. Quake, "Microfluidic Large-Scale Integration", *Science*, Vol. 298, pp. 580-584, 2002. The silicon breadboard 606 is sandwiched between the fluid layer 602 and the electromechanical layer 604. The through-holes 610 forming the through-wafer fluid channels are preferably made by DRIE in silicon, allowing for a densely packed array of holes (for example, each through-hole being 100 μm in diameter).

Comprehensive microfluidic systems incorporate multiple functional components, as described above. However, development of microfluidic systems has been significantly complicated by the fact that many different components typically must be integrated on the same physical platform. Because the development process of microfluidic systems are generally involved with high costs and long development cycles, end users are not generally able to have access to custom chips that satisfy their specific system level needs because the development process is extremely long and costly. As described above, one strategy to reduce the cost and time of developing microfluidic systems is to develop modular functional units that are common to many applications, allowing assembly of a more complex system by interconnecting multiple functional units. In addition to vertically stacking multiple functional units so that fluid flows vertically between the functional units, as described above, an alternative embodiment is to interconnect one or more of the multiple layer microfluidic systems 400 to form a more complex system.

Figure 18:
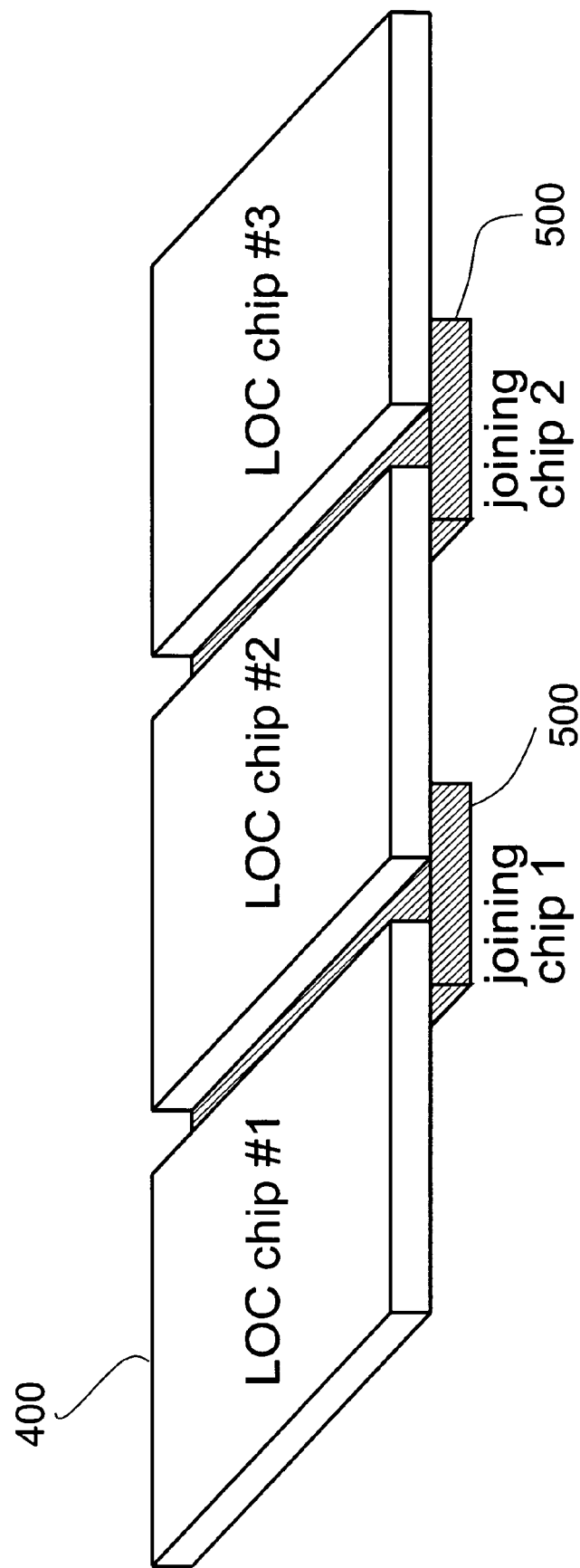
FIG. 18 shows an array of microfluidic chips connected by fluid connectors, according to another embodiment of the present invention.

FIGS. 17A and 17B show a cross-section of a pair of microfluidic chips 400, including the fluid outlet 416 of a first microfluidic chip and the fluid inlet 414 of a second microfluidic chip. According to a preferred embodiment of the present invention a fluid connector 500 is provided (FIG. 17B) to connect for fluid communication the inlet 414 of the second microfluidic chip 400 with the outlet 416 of the first microfluidic chip. In this way, more complex microfluidic systems can be provided. FIG. 18, for example, shows first, second, and third microfluidic chips 400 joined by a pair of fluid connectors 500.

Figure 19:
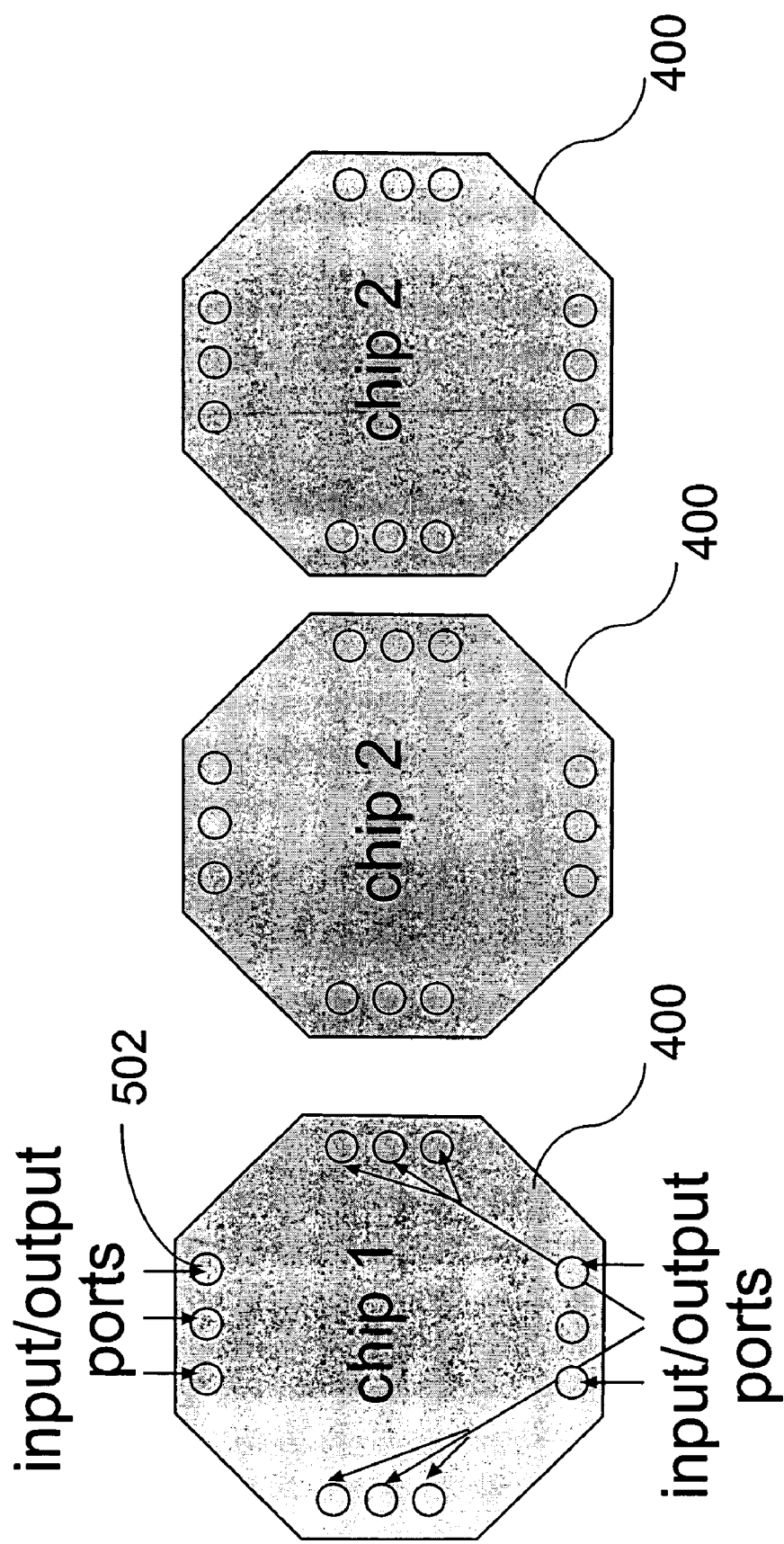
FIG. 19 shows individual microfluidic chips with inlet and outlet ports, according to another embodiment of the present invention.
Figure 20:
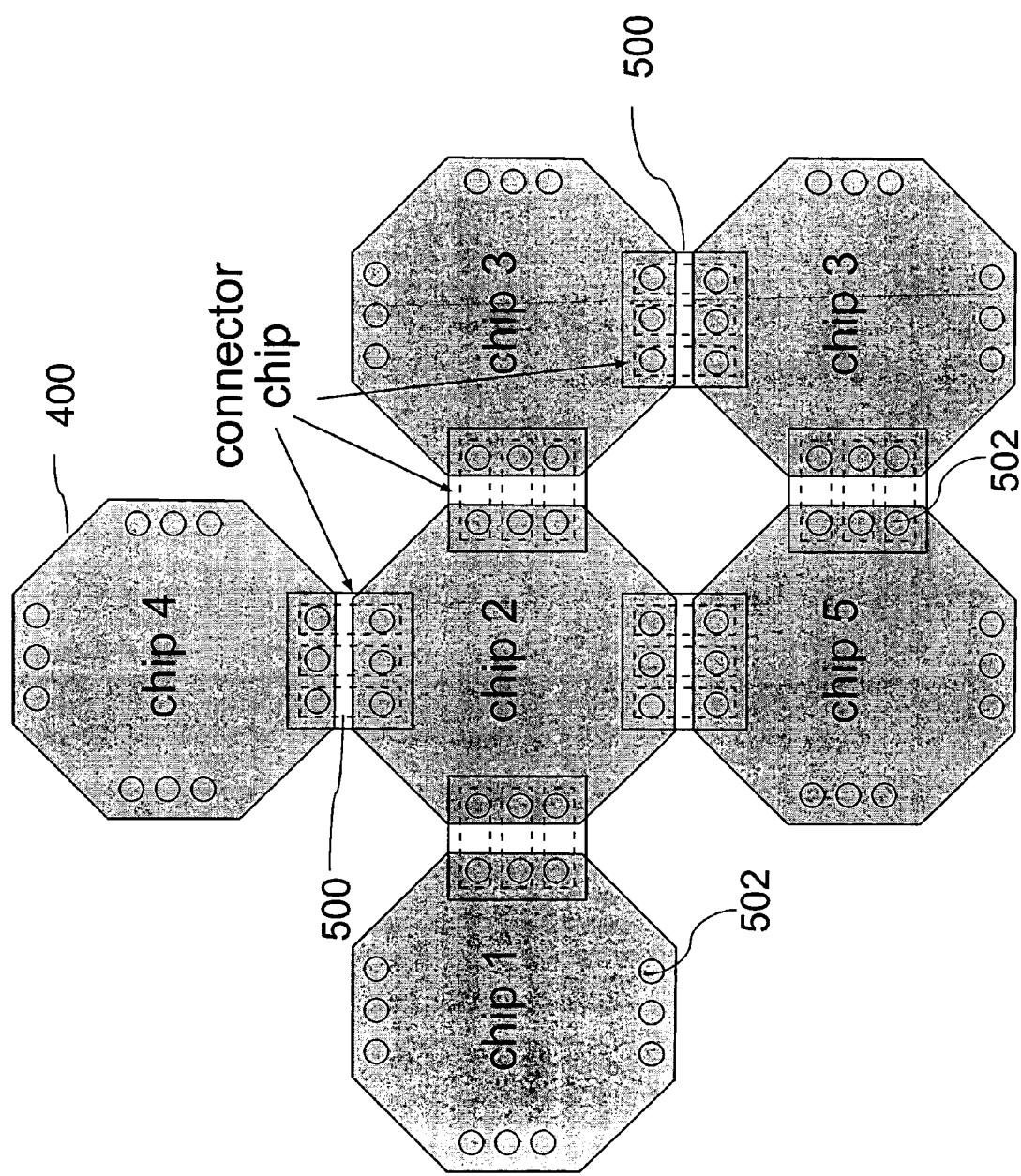
FIG. 20 shows a number of chips connected to one another to form a microfluidic system.

It should be understood that the horizontally arranged array shown in FIG. 18 is but an exemplary embodiment of a more complex microfluidic system, and that it is possible for the microfluidic chips 400 to be joined on a horizontal plane in various configurations. For example, FIG. 19 shows three microfluidic chips 400 with inlet/outlet ports 502 disposed at peripheral locations on each chip. Referring now to FIG. 20, the microfluidic chips 400 are connected to one another by the fluid connectors 500 and together form an array for performing a multi-step process. The chips 400 are connected at their inlet/outlet ports 502.

Figure 21:
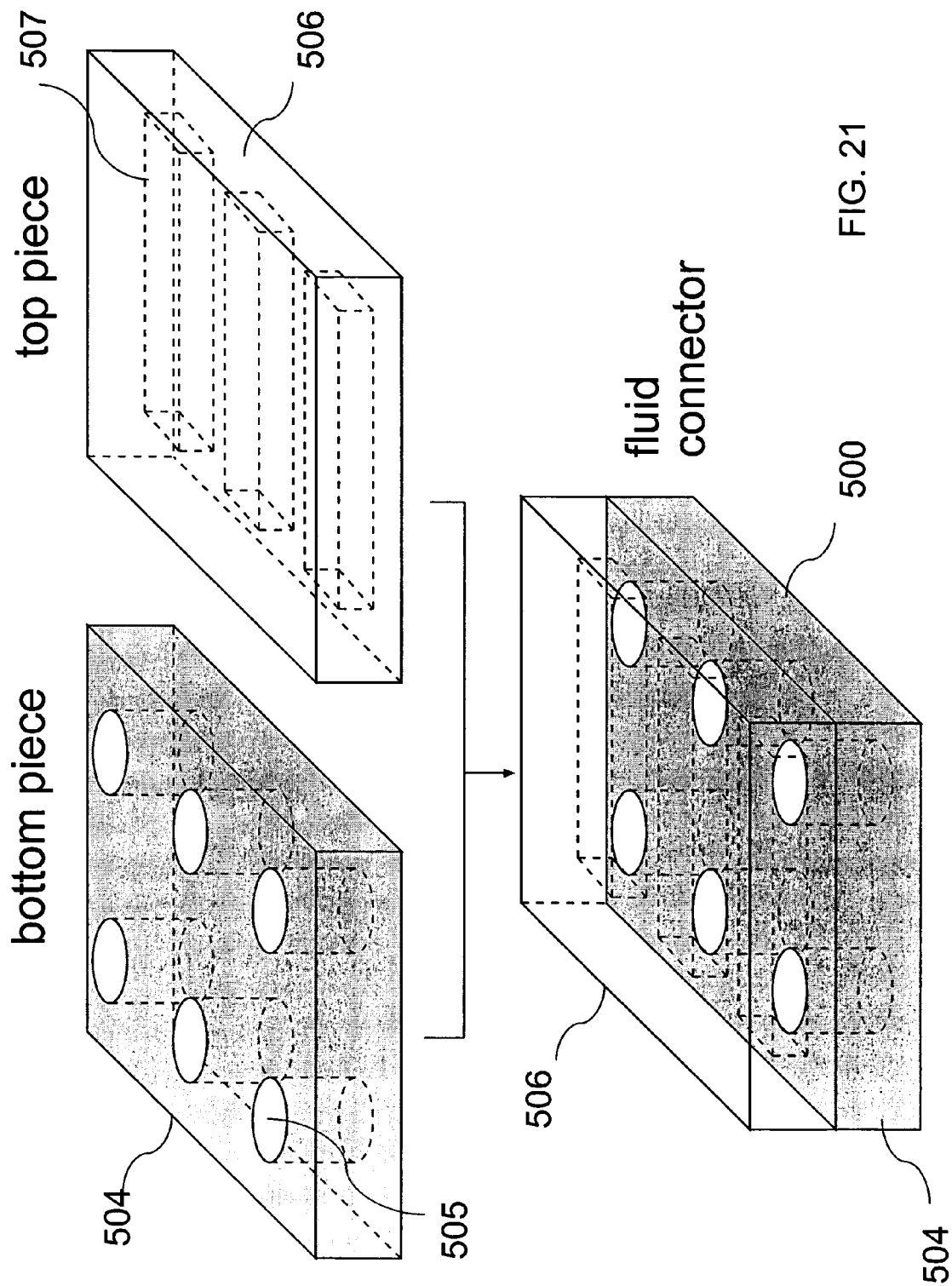
FIG. 21 shows an exemplary method for making a fluid connector, according to another embodiment of the present invention.

An exemplary method of forming the fluid connector 500 is shown in FIG. 21. A bottom piece 504 includes a number of through-holes 505 for transmitting fluid, which may be formed by, for example, molding, reactive ion etching (RIE), machine milling, or ultrasonic drilling. A top piece 506 includes a number of channels 507 that, when the fluid connector 500 is formed, the channels are aligned with the holes. The channels 507 may be made by, for example, molding, RIE, anisotropic wet etching, and other processes. Both pieces 504, 506 may be made of PDMS, silicon, or glass, for example, and may be bonded together by soft bonding (contact bonding), high temperature bonding, or other methods.

It is further contemplated that a combination of vertical stacking using the modular embodiment functional units described above, and the horizontal arrangements of FIG. 18 may be used to provide an overall microfluidic system that may be, for example, more portable than other systems, yet more easily configurable by an end user.

Furthermore, it is contemplated that, if one or more of the microfluidic chips 400 is reversibly bonded within an overall system, individual chips may be selectably removable for carrying out particular functions within the chip. For example, during the course of carrying out a multi-step chemical/biological reaction protocol, certain chips 400 may be temporarily and physically removed from the chain forming the overall system. The removed chip 400 may be, for example, mechanically, chemically, and/or radioactively treated, to produce an effect on fluid samples within the chip. The piece may then be returned to the overall system and bonded. This method allows, among other features, processes that may be difficult to realize at a microchip scale (such as, but not limited to, ultrasonic agitation, cavitation, centrifuging, radiation, magnetic resonance imaging (MRI), to be performed on the fluid sample. Fluid samples at different stages of a process may also be harvested from a reaction and collected.

A number of components for the microfluidic system 400 will now be disclosed. However, the microfluidic system 400 of the present invention is not to be limited to systems necessarily having one or more of the components. Furthermore, it is contemplated that the microfluidic system 400 may have components other than those disclosed herein.

Architectures of existing microfluidic systems typically fall into two categories: monolithic systems and hybrid systems. A monolithic system is made of one piece of material, such as silicon, glass, silicone elastomer, or polymer. A hybrid system, on the other hand, is made by bonding two or more pieces of materials. A preferred embodiment of the present invention allows the use of hybrid microfluidic systems by decoupling the material and fabrication issues between the fluid layer 402 and the electromechanical layer 404, especially as the silicon micromachining of the electromechanical layer is not necessarily biocompatible with the fluid layer. Sophisticated, yet relatively simple fabrication is possible, and further allows miniaturization and integration of various components. Time and cost of development are minimized.

FIGS. 22A-22D and 23A-23B respectively show a general monolithic approach and hybrid approach for forming a channel on a microfluidic system. Beginning with a substrate 850 (FIG. 22A), a sacrificial layer 852 is formed (FIG. 22B). A channel wall 854 is formed (FIG. 22C) over the sacrificial layer 852 and may be of a structural material, such as, but not limited to, Parylene. Finally, as shown in FIG. 22D, the sacrificial layer 852 is removed to open the channel. In contrast, referring to FIG. 23A, a hybrid channel formation approach first involves a recess 860 formed into a substrate 862, and the substrate is combined with another substrate 864 (FIG. 23B) to form the channel between them.

The electromechanical layer 404 may include one or more electromechanical components for moving fluid through the microfluidic system 404. For example, FIGS. 24A and 24B show an electrostatic valve 450 integrated into the electromechanical layer 404. Two fluid channels 408 within the fluid layer 402 are connected to each other using the through-wafer holes 410. The valve 450 in this embodiment is a diaphragm valve located at a back plane of the electromechanical layer 404. The valve 450 includes an integrated metal electrode 452. A counter-electrode 454 is positioned at the bottom surface of the electromechanical layer 404. The valve, which preferably is a membrane, further includes two o-ring seats 456, which may be, for example, made of silicone elastomer. The two o-ring seats 456 are registered with the two through-wafer holes 410.

In operation, when no voltage is applied, the membrane of the valve 450 is in the relaxed position and the fluid can pass between the channels 408. If an electrostatic potential is applied between the electrodes 452, 454, an electrostatic attraction force is developed, thus deforming the membrane of the valve 450. The deformed membrane forces the o-ring seats 456 to be completely in contact with the openings of the through-holes 410, thereby stopping the flow, as shown in FIG. 24B. To provide the electrostatic potential, the electrodes 452 and 454 are connected to a voltage source 458 via a suitable connection path 460. A suitable voltage to be applied will depend on, for example, the area and material of the membrane of the valve 450, the average spacing between the electrodes 452 and 454, and the diameter of the opening of the through holes 410. Using an appropriate applied voltage can produce a desired fluid pressure held by the membrane of the valve 450. Instead of electrostatic actuation, it is also contemplated that the valve 450 can be actuated by thermal bimetallic actuation, pneumatic actuation, magnetic actuation, acoustic waves, or other methods.

Figures 25A, 25B, 25C, 25D, 25E, 25F, 25G, 25H, 25I, 25J, 25K, 25L:
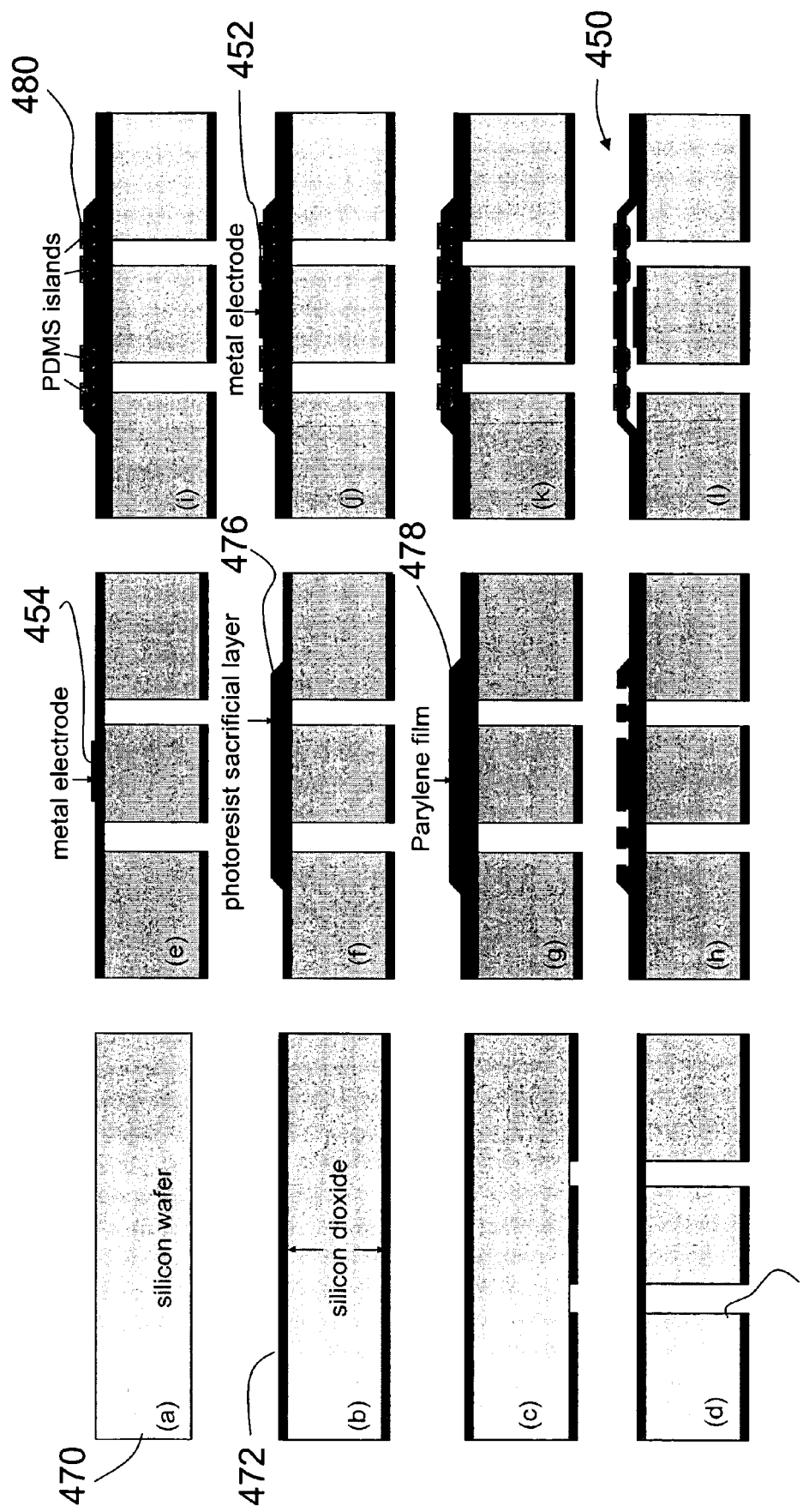
FIGS. 25A-25L show a method to form an electrostatic valve, according to an embodiment of the present invention.

FIGS. 25A-25L illustrate a preferred method to form the membrane valve. Starting with a silicon wafer 470 (FIG. 25A), silicon dioxide films 472 are grown on both the front side and the back side of the wafer, as shown in FIG. 25B. The oxide 472 on the back side of the wafer 470 is photolithographically patterned (FIG. 25C). In certain areas the silicon material 472 is exposed. DRIE is preferably used to etch through the silicon wafer (FIG. 25D) until the front side silicon oxide is reached. A metal electrode 474 is deposited and patterned (FIG. 25E), followed by the deposition and patterning of photoresist 476 (or other sacrificial layer materials) (FIG. 25F).

A structural layer 478, for example, a Parylene film, is deposited on the front side of the wafer 470 (FIG. 25G). Care is taken to ensure that the Parylene 478 does not enter the back side of the chip and inside the formed through wafer holes 410. The Parylene film 478 is patterned, using an oxygen plasma etching method. A fraction of the sacrificial layer 476 is also etched, thus producing a profile such as that shown in FIG. 25H. Next, planar patterning of PDMS 480 or other silicone elastomer materials is performed (FIG. 25I). Next, the top metal electrode 452 is deposited and patterned (FIG. 25J). The oxide 472 at the bottom of the through-wafer holes 410 then is selectively removed. This exposes the sacrificial material 476 at the bottom of the through-wafer holes 410 (FIG. 25K). The removal of the sacrificial layer 476 (FIG. 25L) completes the process.

Contact valves having a small footprint, straightforward fabrication, and simple operation may be used to realize large scale, as well as portable, microfluidic-based diagnostic systems. One approach is to use an elastomer such as PDMS, as PDMS readily seals to common substrates (such as, but not limited to, glass and silicon), and forms a strong hermetic bond with itself. One concern in designing a pneumatic valve is the reduction of operating pressure, which allows integration of on-chip electromechanical control, rather than the requirement of using off-chip pneumatic actuators. A preferred embodiment of a PDMS pneumatic valve is provided that is preferably operated at 20 Kpa.

FIGS. 26A-26C show an exemplary embodiment of a pneumatic valve 510. The pneumatic valve 510 includes a thin PDMS membrane 512 sandwiched between the electromechanical layer 404 and the fluid layer 402, which is preferably also made of PDMS. The PDMS membrane 512 is disposed to cover the through-hole 410 of the electromechanical layer 404, which is registered with the fluid channel 408 of the fluid layer 402. FIG. 26A shows the pneumatic valve 510 in a state having no pressure input on the membrane 512, thus allowing fluid flow through the complete fluid channel 408 of the fluid layer 402. Under pneumatic actuation, the membrane 512 pushes against the channel in a conformal fashion, to impede the fluid flow. By minimizing thickness of the PDMS membrane 512, operating pressure can be reduced for a membrane area, for example, 100×100 µm. FIG. 26B shows a state in which the pneumatic valve 512 is closed, as the deformed membrane 512 contacts the PDMS fluid layer 402 to close off the fluid channel 408.

FIGS. 27A-27E show a preferred microfabrication process for forming the pneumatic valve 510. As shown in FIG. 27A, silicon dioxide 520 is thermally grown on a silicon wafer 522 to a thickness of 1 micron. The oxide 520 from one side of the wafer 522 is patterned, and high aspect ratio through-holes 410 are formed in the wafer using DRIE, stopping at the oxide layer on the other side (FIG. 27B). A sacrificial layer 524 is formed (FIG. 27C), preferably using conventional photolithography on top of the oxide layer 520. Next, PDMS 526, preferably with a 20:1 base to curing agent mixing ratio, is then spin-coated to a thickness of approximately 10 µm, and cured at 90° C. for one hour (FIG. 27D). The portion of the oxide 520 covering the through-holes 410 is then etched, preferably in a buffered oxide etch (BOE) solution, and the photo-resist structures 524 are removed with acetone, producing the membrane 512 of PDMS shown in FIG. 21E.

In operation, referring again to FIG. 26A, the fluid channel 208 formed in bulk PDMS of the fluid layer 402, crosses the membrane 512 in absence of pneumatic input. In FIG. 26B, with a pressure of, for example, 20 Kpa, the channel 408 is effectively cut off by the deformed membrane 512. The membrane 512 forms a hermetic bond with the opposing channel walls 408 when sufficient actuation pressure is provided. Upon releasing the pressure, the membrane 510 remains bonded to the channel wall (FIG. 26C), thereby creating a latching valve. The pneumatic valve 510 allows, for example, implementation of programmable fluid circuits, on-chip fluid storage, and other applications. Valves may be created with memory for the programmable fluid circuits.

Microfluidic systems frequently encounter the use of membranes for valving and pumping actions. For example, membranes in sensors and actuator applications are typically made of materials with a high Young's modulus (for example, silicon, or silicon nitride) or well-cured polymers such as polyimide and Parylene. Such "hard" membranes allow integration of electrodes for integrated actuation (such as electrostatic actuation), but do not provide a sufficiently tight seal against liquids and gases. On the other hand, soft elastomer materials, such as PDMS, are suitable for forming leak-tight seals, but it is generally difficult to form a continuous membrane made of soft elastomeric materials. A large continuous soft membrane made of PDMS, for example, can collapse against opposing surfaces and clog fluid channels. Furthermore, it is difficult to integrate electrodes onto PDMS membranes for actuation purposes.

Figure 28:
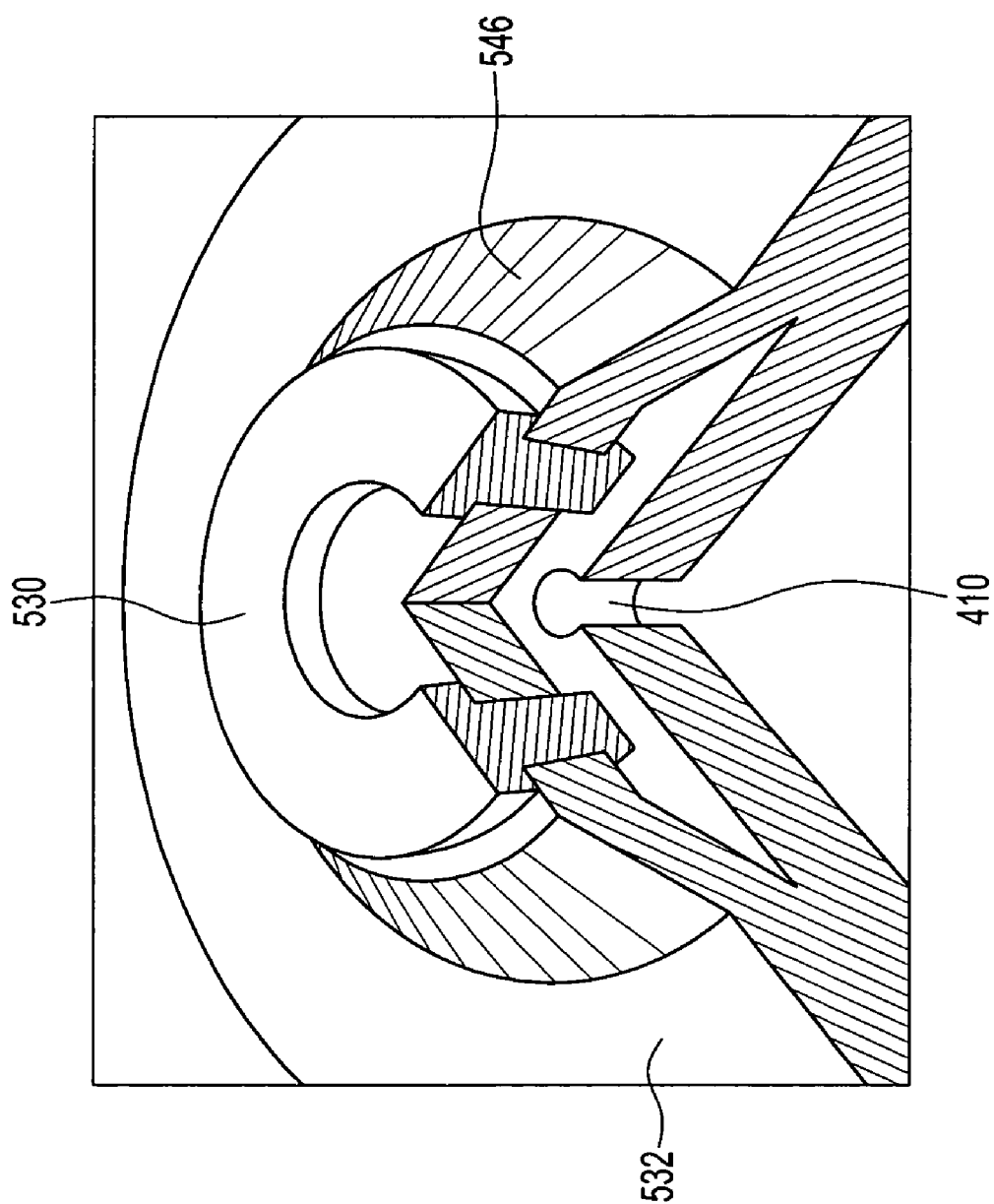
FIG. 28 shows an elastomer ring on a membrane, according to another embodiment of the present invention.

Another embodiment of the present invention integrates a soft material, such as PDMS or other soft elastomer, with a "hard" membrane, which is made using surface micromachining. FIG. 28 shows an elastomer ring such as, but not limited to, PDMS o-ring 530 disposed on a Parylene membrane 532, which are both disposed over the through-hole 410. Portions of each are removed in FIG. 28 for clarity.

FIGS. 29A-29F show a preferred process for manufacturing the elastomer ring 530 on the membrane 532. On a substrate 534, for example silicon, glass, or polymer, a photoresist 536 is patterned as a sacrificial layer, and the photoresist is covered with a Parylene thin film 538 (FIG. 29A). Next, the Parylene thin film 538 is etched, preferably using oxygen plasma, in selective windows, and the photoresist 536 is etched to a fraction of its total height, as shown in FIG. 29B. The height of the photoresist 536 left as shown in FIG. 29B determines a clearance between the elastomer ring 530 and the surface of the silicon wafer 534. Next, as shown in FIG. 29C, a second photoresist 540 is deposited, planarized by reflow, and patterned. PDMS 542 then is formed and patterned (FIG. 29D) to leave cured PDMS only in a recessed area 544 defined in the steps shown in FIG. 29B.

The second photoresist 540 is then removed (FIG. 29E) using a developer, for example, and the sacrificial photoresist 536 underneath the Parylene thin film 538 is removed, for example using acetone, through selectively placed etch holes (FIG. 29F), forming a clearance 546. For example, in the elastomer ring 530 and membrane 532 shown in FIG. 28, the diameter of a membrane chamber 546 formed on the Parylene membrane 532 may be, for example, 300 μm and the elastomer ring 530 may have an inner diameter of, for example 130 μm with a width of 40 μm. It should be understood that these diameters are exemplary. It is also contemplated that the elastomer ring 530 may be shaped in many different forms, besides that of an o-ring.

Figures 30A, 30B:
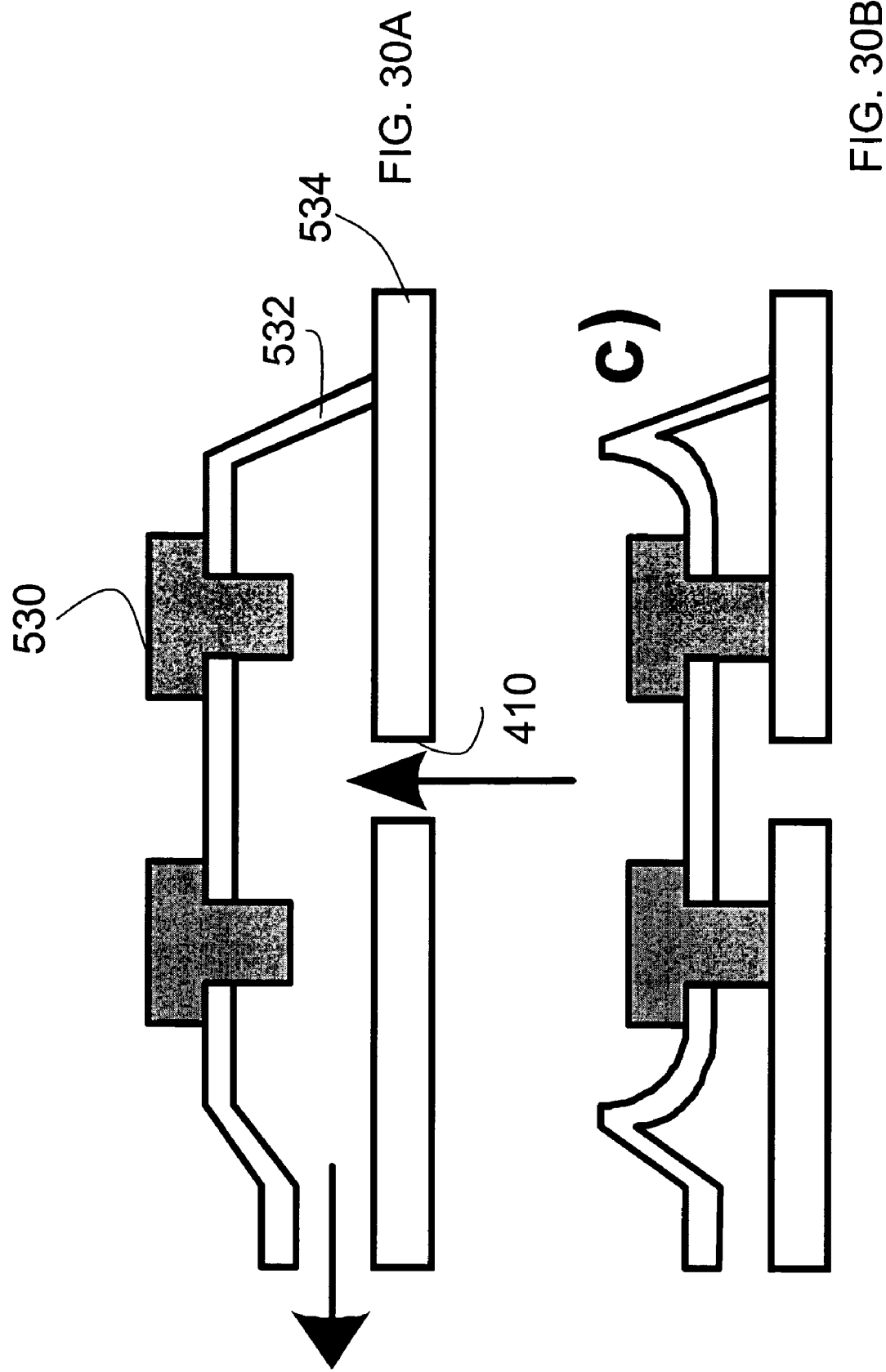
FIGS. 30A-30B show a membrane in open and closed positions, respectively.

In operation, as shown in FIG. 30A, fluid is free to travel through the through-hole 410 when the elastomeric ring 530 does not contact the silicon surface. As shown in FIG. 30B, the membrane 532 may be made to move closer to the silicon substrate 534, to produce a seal between the elastomer ring 530 and the silicon surface. For example, the membrane 532 may be placed on a stationed chuck, and pushed by a translational chuck having matching protrusion features. As the seal is formed between the elastomer ring 530 and the silicon surface 534, fluid flow is halted. After pressure is removed, the membrane 532 returns to the configuration shown in FIG. 30A. The membrane 532 is preferably configured to restore its shape after such pressure is removed. Other methods for urging the membrane 532 toward the silicon surface 534 include, but are not limited to, electrostatic actuation, magnetic actuation, thermal actuation, and pneumatic methods. The elastomer ring 530 creates a seal with the silicon surface 534. FIG. 31A shows a top view of the elastomer ring 530 both underneath and on top of the membrane 532. FIG. 31B shows a cross-section of the ring 530 and membrane 532.

In microfluidic systems, fluidic components and electromechanical components, such as diaphragm valves and/or pumps, can reside on an opposite face of a chip from the interface with a fluid layer, thus eliminating conflicts with fluid components in terms of compatibility of fabrication and chemistry. However, an important element for realizing the microfluidic system 400 is construction of fluidic through-wafer interconnects having low dead volume.

Figure 32:
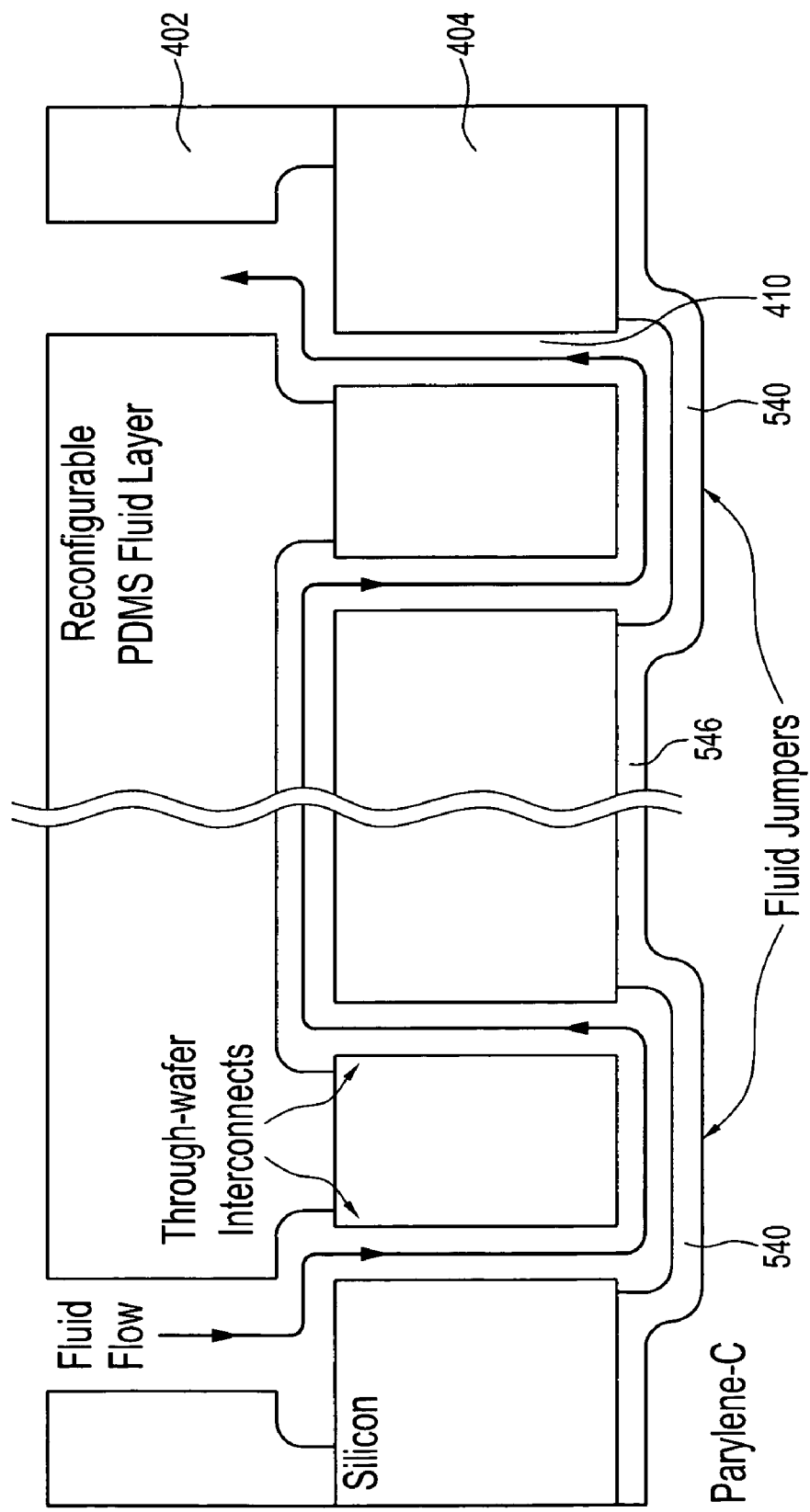
FIG. 32 shows an integrated fluid jumper, according to another embodiment of the present invention.

To reduce or minimize dead volume, an embodiment of the present invention combines low dead volume silicon interconnect formed using DRIE with integrated jumpers and reconfigurable elastomer materials. An exemplary embodiment of such interconnects and elastomer materials is shown in FIG. 32. As shown in FIG. 32, the through-wafer holes 410 are formed in the electromechanical layer 404, such as a silicon layer, and a pair of fluid jumpers 540 are provided and integrated on the back side of the silicon layer, formed of a material such as Parylene-C.

Figure 33:
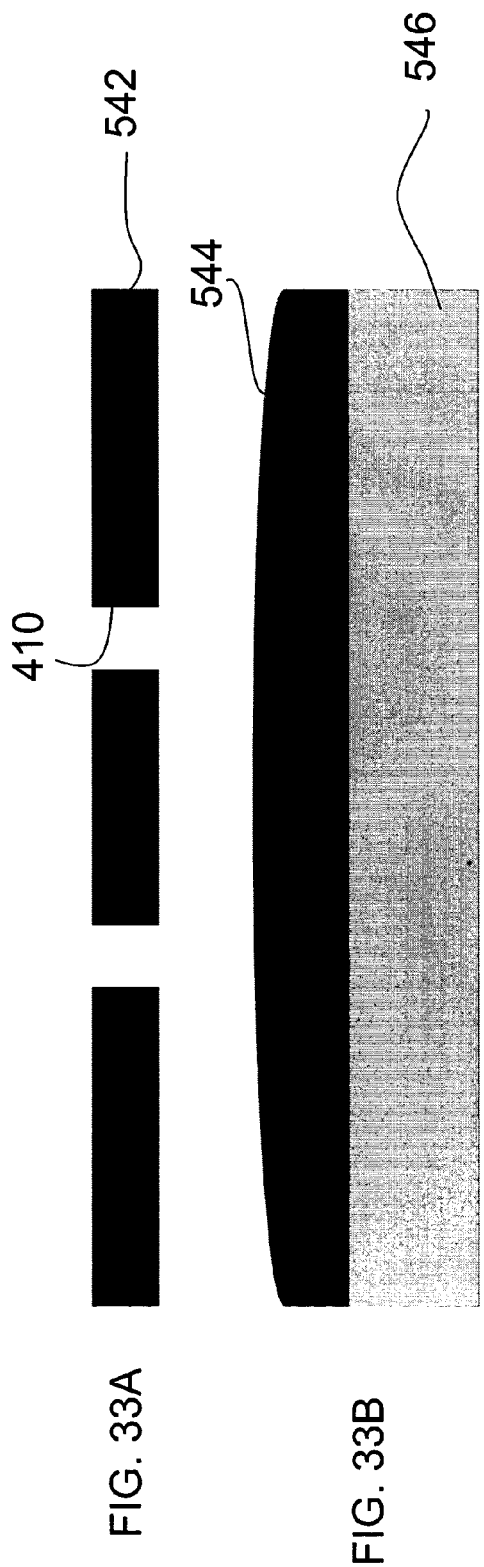
FIGS. 33A-33E show a process for making a fluid jumper.

In an exemplary method to form the through-holes and fluid jumpers 540, the through-wafer holes 410 are selectively drilled (FIG. 33A) in a silicon layer 542 using, for example, DRIE. The holes are then filled with a photoresist 544, to provide a planar surface for subsequent processing steps. For example, as shown in FIG. 33B, one side of the silicon layer 542 is sealed to a cured slab of bulk PDMS 546 so that the back side surface is kept clean. The photoresist 544 is then dropped on the front side of the silicon layer 542, and any trapped air in the through-holes 410 is replaced by the photoresist while in a vacuum chamber. The photoresist 544 is baked slowly to sufficiently drive out solvent and minimize bubble formation.

After baking, fluid jumper molds 548 (FIG. 33D) are formed with photoresist on the silicon surface 542 using, for example, conventional photolithography. Parylene-C 550 is then deposited on the formed photoresist 548 on the front side, and the photoresist 544, both in the through-holes 410 and on the silicon surface 542, is removed with, for example, acetone. Accordingly, the fluid jumper is formed registered with through-holes 410 (FIG. 33E).

With the PDMS fluid layer registered with the silicon chip of the electromechanical layer 404, urging of a portion of the membrane 546 toward a surface of the silicon electromechanical 404 by suitable methods, such as, but not limited to, electrostatic actuation, magnetic actuation, thermal actuation, piezoelectric actuation, pneumatic actuation, etc., forms the fluid jumpers 540. Accordingly, fluid flow from the fluid layer 402 and through the through-holes 410 are directed from, for example, the far left through-hole 410 as shown in FIG. 32 to be detoured through, for example, the second and third through-holes and their corresponding channels 408 within the fluid layer 402.

Figure 36:
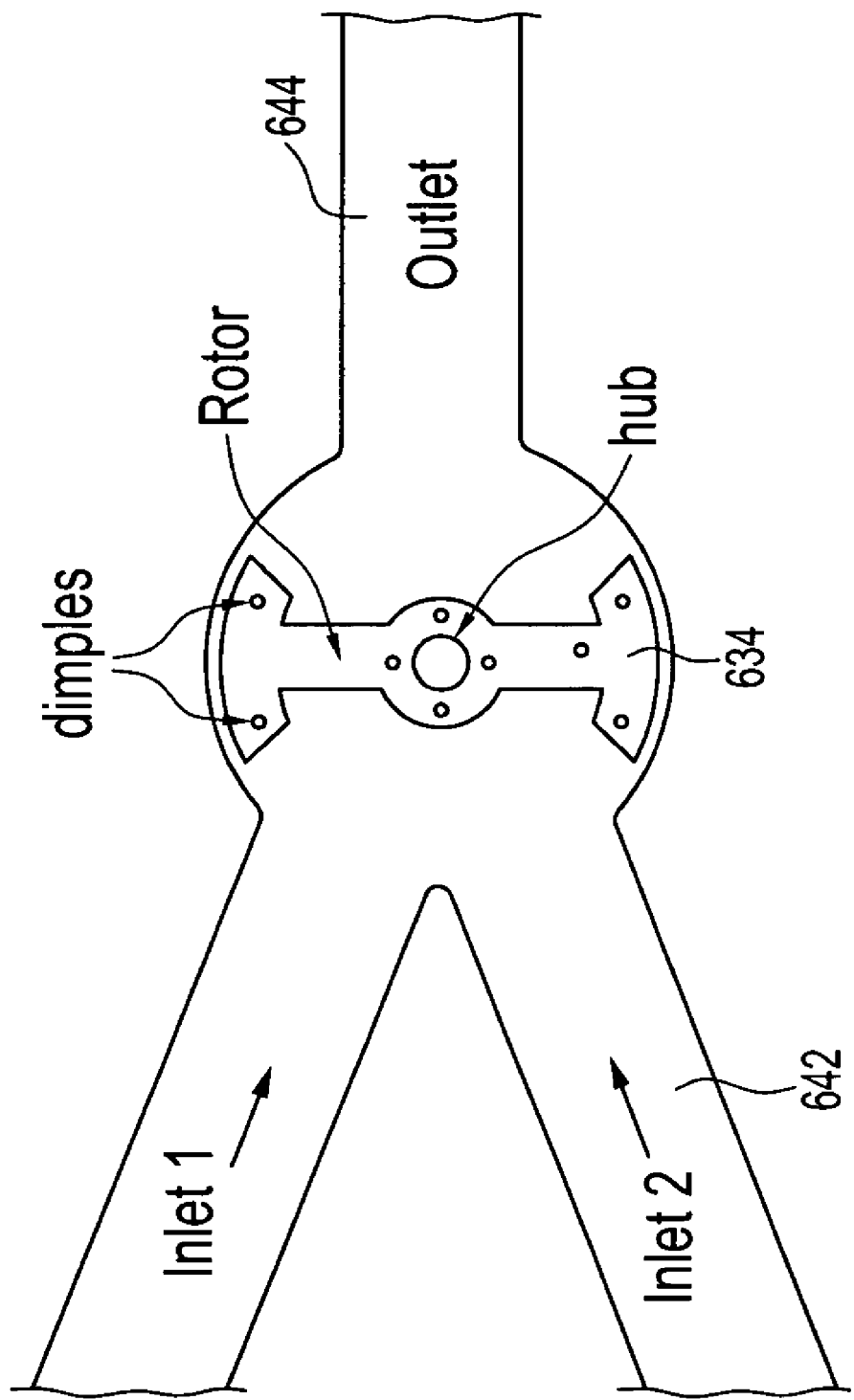
FIG. 36 shows a magnetic stirrer having dimples.

Another possible component for the microfluidic system 400 is a magnetic stirrer, which may be used for, for example, mixing or pumping fluid. An exemplary magnetic stirrer is shown in FIG. 34, within a Parylene channel 630, a portion of which also forms a stator for the stirrer. In an exemplary embodiment, a rotor 634, made of a suitable magnetic material, is disposed about a hub 632 within the Parylene channel 630. The rotor 634 is preferably arranged within the Parylene channel 630 so that a clearance 636 is provided between distal ends of the rotor and an inside wall 638 of the Parylene channel 630. For example, this clearance may be 10 μm. Furthermore, as shown in FIG. 36, the rotor 634 may contain one or more dimples 640 to reduce friction.

Upon activation by a suitable magnetic field, the rotor 634 rotates to move fluid through the Parylene channel 630. For example, as shown in FIG. 35A, a mixer is provided by introducing a pair of inputs 642 into a single channel 644, and providing the rotor 634 within the single channel. Activation of the rotor 634 mixes fluids from the input 642 and moves the mixed fluid through an output of the single channel 644. In an alternative embodiment shown in FIG. 35B, the hub 632 of the magnetic stirrer is offset with respect to a fluid channel 646, so that rotation of the rotor 634 about the hub 632 propels fluid through the channel 646, thus acting as a pump.

In the three-layer system 600, elastomer fluid jumpers and corresponding pneumatic valves are fabricated independently of the silicon breadboard 606. This process preferably is a two-layer PDMS bonding process that allows the creation of pneumatic elastomer membrane valves at the vertical intersection of pneumatic control channels and fluid jumpers.

Figure 37:
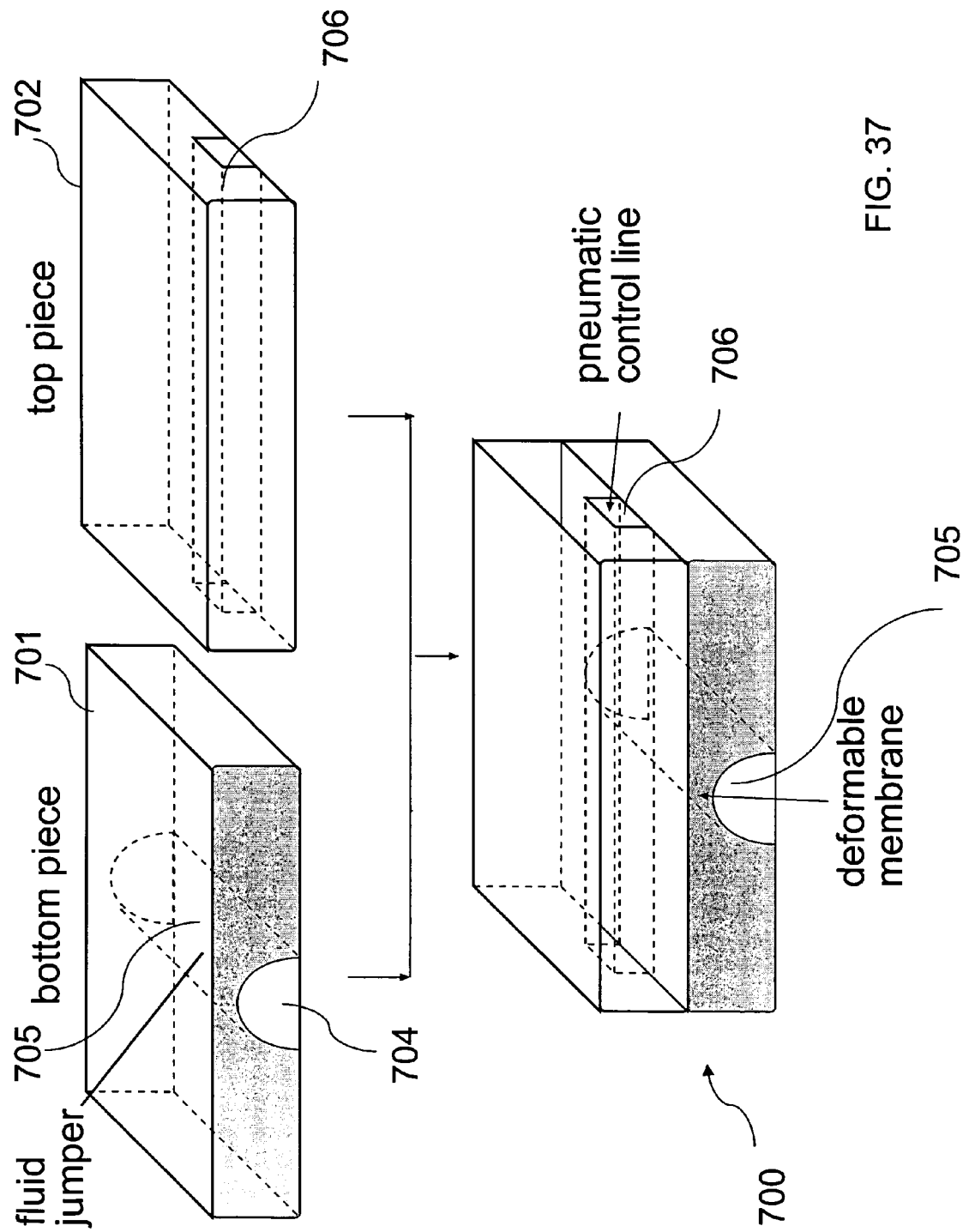
FIG. 37 shows a formation method for a valve in a PDMS electromechanical layer, according to another embodiment of the present invention.
Figure 38B:
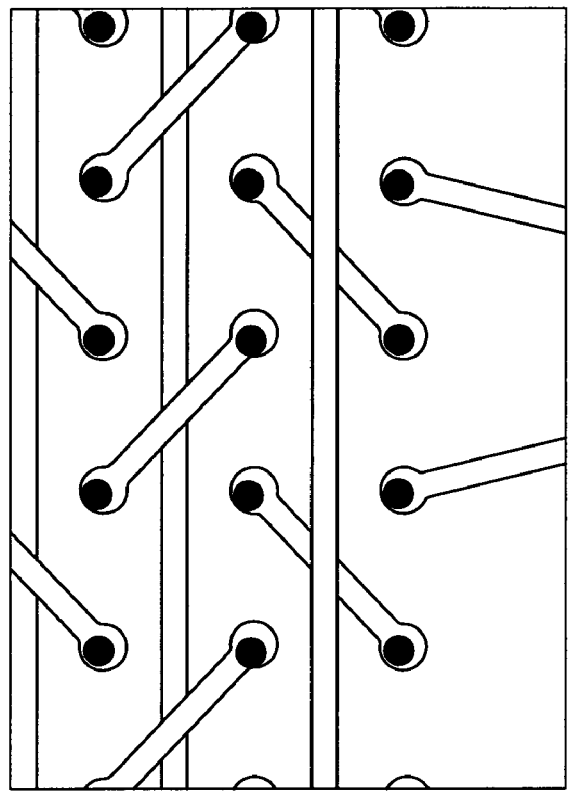
FIGS. 38A-38B show a pneumatic valve in open and closed positions, respectively.
Figure 38A:
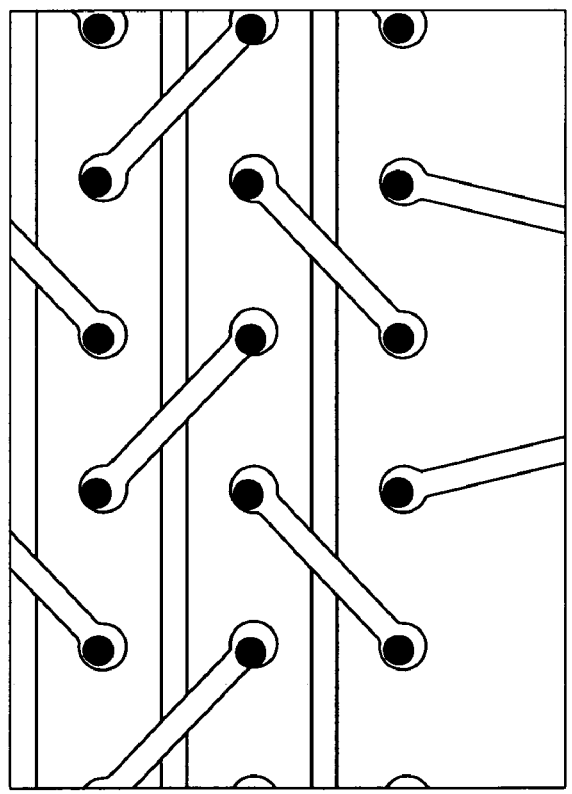

One method to make a valve 700 in a PDMS electromechanical layer is to use a pneumatic control that collapses a wall of a jumper. A formation technique is shown in FIG. 37. Two layers are prepared, a bottom layer 701 and a top layer 702, both made of silicone elastomer such as PDMS. The bottom layer 701 is molded, and has a fluid jumper channel 704 with a relatively thin top membrane 705. The top layer 702, also molded, has a pneumatic control line channel 706, which preferably has a thicker wall than the membrane of the jumper channel 704. The two pieces are bonded with the channels 704, 706 in them crossing one another. In operation, pneumatic pressure applied to the pneumatic control line channel 706 in the top piece 702 deforms the membrane 705, and closes off the channel 704 in the bottom piece 701. An example of a group of through-holes with fluid jumper channels 704 actuated by pneumatic control line channels 706 is shown in FIG. 38A in an open position, and in FIG. 38B in a closed position.

According to another embodiment of the invention, one or more ports, components, etc., may be connected to a suitable processor, such as a computer. In this way, both control and feedback can be provided by the processor. It is contemplated that the microfluidic system 400, 600 may be controlled by the processor to provide substantially or completely automated control for research testing or applications, for example. It will be understood that by providing a suitable user interface, a user, for example, may control the processor to in turn control the microfluidic system 400, 600.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, as set forth in the appended claims.

Various features of the invention are set forth in the appended claims.

The invention claimed is:

1. A method of fabricating a microfluidic device that performs a multistep process, the method comprising the steps of:
   partitioning the process into a plurality of sequential steps;
   providing a plurality of stand-alone functional units, each of said plurality of functional units having at least an inlet, an outlet, and at least one microfluidic channel disposed between the inlet and the outlet, the at least one microfluidic channel being enclosed by joined upper and lower surfaces, each of said plurality of functional units being configured for performing each of said plurality of sequential steps, respectively, between the inlet and the outlet and within the at least one microfluidic channel;
   arranging said plurality of functional units vertically so that at least one of said inlet and outlet for each functional unit is vertically aligned with at least one of said inlet and outlet of an adjacent one of said functional units to form at least one junction that allows fluid communication between adjacent functional units; and
   combining said arranged plurality of functional units to permit fluid communication between said plurality of functional units to form the microfluidic device.

2. The method according to claim 1 further comprising the step of:
   bonding said plurality of provided functional units directly together.

3. The method according to claim 1 wherein each of the functional units comprises at least a first plate and a second plate.

4. The method according to claim 3 wherein said providing comprises bonding said first plate and said second plate to one another.

5. The method according to claim 3 wherein said providing comprises clamping said first plate and said second plate to one another.

6. The method according to claim 1 wherein each of said functional units include at least one element for performing a step in the process other than fluid flow.

7. The method according to claim 1 wherein each of said inlet and outlet ports is disposed in a standardized location for each of said functional units.

8. The method according to claim 1 further comprising the steps of:
   determining a sequence of said plurality of steps; and
   arranging said functional units vertically according to said determined sequence.

9. The method according to claim 1 wherein said providing step comprises the step of:
   selecting said plurality of functional units from a greater plurality of prefabricated functional units.

10. The method according to claim 1 wherein said providing step comprises the step of:
    fabricating at least one of said plurality of functional units.

11. The method according to claim 10 wherein said step of fabricating comprises the steps of:
    providing a first plate and a second plate; and
    bonding said first plate and second plate together to form said functional unit;
    wherein said at least one microfluidic channel is provided between said first plate and said second plate, and wherein said first plate and said second plate provide said first surface and said second surface, respectively.

12. The method according to claim 11 wherein said step of fabricating further comprises the step of:
    forming at least one element on at least one of said first plate and second plate, each of said at least one element being configured to perform at least part of one of said plurality of steps.

13. The method according to claim 12 wherein said step of fabricating further comprises the step of:
    forming said microfluidic channel on at least one of said first plate and said second plate.

14. The method according to claim 13 wherein said bonding step compresses said microfluidic channel so that said microfluidic channel is sealed between said first plate and said second plate.

15. A method of designing a microfluidic system to perform a process having a plurality of steps, the method comprising the steps of:
    providing a set of pre-fabricated stand-alone functional units, each of said functional units having at least an inlet port, an outlet port, and at least one microfluidic channel disposed between the inlet port and the outlet port and enclosed by joined upper and lower surfaces, each of said functional units being configured for performing a specific process step between the inlet port and the outlet port and within the at least one microfluidic channel;
    selecting two or more of said set of functional units, each of said selected functional units being configured for performing one of the plurality of steps;
    arranging said two or more selected functional units vertically so that at least one of the inlet port and the outlet port for each arranged functional unit is vertically aligned with at least one of the inlet port and the outlet port of an adjacent one of said two or more functional units to form at least one junction that allows fluid communication between adjacent functional units; and
    combining said arranged two or more selected functional units to form the microfluidic system.

16. The method according to claim 15 wherein said inlet port and said outlet port are disposed at a standardized location, and wherein adjacent functional units when combined allow fluid communication directly between aligned inlet and outlet ports.

17. A method of producing a microfluidic system comprising:
    providing an electromechanical layer including a plurality of electromechanical components formed on a back side of the electromechanical layer;

forming a fluid layer having a plurality of channels;

providing a plurality of through-holes in the electromechanical layer registered with one or more of the electromechanical components;

bonding the formed fluid layer to a front side of the electromechanical layer so that the channels of the fluid layer are connected to the one or more electromechanical components via one or more of the through-holes.

18. The method of claim 17 wherein said fluid layer is made from an elastomer.

19. The method of claim 18 wherein said step of forming the fluid layer comprises:

forming a reverse mold on a surface of a substrate corresponding to the channels;

pouring a precursor onto the substrate;

curing the precursor;

removing the precursor to provide the fluid layer.

20. The method of claim 19 wherein said step of forming the reverse mold comprises distributing a material of the mold onto the substrate through a nozzle.

21. The method of claim 17 further comprising:

connecting at least one of the one or more electromechanical components to a processor.

22. A method of forming a microfluidic system that performs a multistep process, the method comprising the steps of:

partitioning the process into a plurality of sequential steps;

providing a plurality of stand-alone microfluidic chips, each of said plurality of microfluidic chips having at least an inlet port, an outlet port, and at least one microfluidic channel disposed between the inlet port and the outlet port and enclosed by an upper surface and a lower surface, each of said plurality of microfluidic chips being configured for performing each of said plurality of sequential steps, respectively, between the inlet port and the outlet port and within the at least one microfluidic channel;

vertically stacking the plurality of provided microfluidic chips, wherein at least one of the inlet port and the outlet port for each microfluidic chip is vertically aligned with at least one of the inlet port and the outlet port for an adjacent one of the microfluidic chips to form at least one junction that allows fluid communication between adjacent functional units;

joining the plurality of microfluidic chips to provide a fluid seal for the at least one junction and permit fluid communication between said plurality of microfluidic chips to form the microfluidic system.

23. The method of claim 1 wherein each of said plurality of functional units further comprises an O-ring seal disposed around at least one of the inlet and the outlet;

wherein the at least one junction includes at least one of the O-ring seals; and wherein said combining provides a fluid seal for the fluid communication between said plurality of functional units.

24. The method of claim 15 wherein each of said plurality of functional units further comprises an O-ring seal disposed around at least one of the inlet port and the outlet port;

wherein the at least one junction includes at least one of the O-ring seals; and wherein said combining at least partially compresses the at least one O-ring seal to provide a fluid seal for the fluid communication between said plurality of functional units.

* * * * *